(12) United States Patent
Sasaki et al.

(10) Patent No.: US 12,454,791 B2
(45) Date of Patent: Oct. 28, 2025

(54) SURFACE MODIFIED MICROCAPSULES

(71) Applicant: International Flavors & Fragrances Inc., Union Beach, NJ (US)

(72) Inventors: Takashi Sasaki, Union Beach, NJ (US); John Brahms, Union Beach, NJ (US)

(73) Assignee: International Flavors & Fragrances Inc., New York, NY (US)

( * ) Notice: Subject to any disclaimer, the term of this patent is extended or adjusted under 35 U.S.C. 154(b) by 1281 days.

(21) Appl. No.: 17/056,621

(22) PCT Filed: May 24, 2019

(86) PCT No.: PCT/US2019/033969
§ 371 (c)(1),
(2) Date: Nov. 18, 2020

(87) PCT Pub. No.: WO2019/227019
PCT Pub. Date: Nov. 28, 2019

(65) Prior Publication Data
US 2021/0207317 A1    Jul. 8, 2021

Related U.S. Application Data

(60) Provisional application No. 62/676,405, filed on May 25, 2018.

(51) Int. Cl.
*D06M 23/12* (2006.01)
*B01J 13/16* (2006.01)
*D06M 13/00* (2006.01)
*D06M 15/564* (2006.01)
*D06M 15/59* (2006.01)

(52) U.S. Cl.
CPC ............. *D06M 23/12* (2013.01); *B01J 13/16* (2013.01); *D06M 13/005* (2013.01); *D06M 15/564* (2013.01); *D06M 15/59* (2013.01)

(58) Field of Classification Search
None
See application file for complete search history.

(56) References Cited

U.S. PATENT DOCUMENTS

| | | | |
|---|---|---|---|
| 8,586,143 B2 | 11/2013 | Frere et al. | |
| 2006/0151374 A1 | 7/2006 | Wu et al. | |
| 2018/0015009 A1* | 1/2018 | Soubiran | A61K 8/87 |

OTHER PUBLICATIONS

International Preliminary Report on Patentability in PCT/US2019/033969 dated Dec. 1, 2020.
International Search Report and Written Opinion in PCT/US2019/033969 dated Sep. 25, 2019.

* cited by examiner

*Primary Examiner* — Jeffrey D Washville

(57) ABSTRACT

A method of preparing a microcapsule composition include the steps of: (a) providing a microcapsule formed of an encapsulating polymer having a primary or secondary amine group. (b) providing a deposition agent having a reactive group, and (c) forming a covalent bond between the primary or secondary amine group and the reactive group to graft the deposition agent to the encapsulating polymer. Also disclosed are consumer products containing these microcapsules.

7 Claims, No Drawings

SURFACE MODIFIED MICROCAPSULES

This application is a U.S. National Stage Application of PCT/US2019/033969 filed May 24, 2019 and claims the benefit of priority to U.S. Provisional Application Ser. No. 62/676,405 filed May 25, 2018, the contents of each of which are incorporated herein by reference in their entirety.

BACKGROUND

Nano- or micro-encapsulation is used in a variety of different applications where there is a need to deliver, apply, or release an active material including a fragrance, flavor, and malodor counteraction agent to a target area in a time-delayed or controlled manner.

Known polyurea or polyurethane capsules face various issues, e.g., low deposition onto a solid surface, low olfactory intensity, and low stability.

Microcapsules were be modified to achieve certain purposes. U.S. Pat. No. 8,586,143 describes grafting microcapsules onto fibers or textiles for producing functional articles. The microcapsules were permanently attached to the fibers or textiles. The grafting method described in U.S. Pat. No. 8,586,143 is unsuitable for modifying fragrance microcapsule to improve the deposition onto skin, hair, furniture surface in wash-off or leave-on consumer products.

There is a need to develop stable and high efficient microcapsules for use in laundry, washing, cleaning, surface care and personal and skin care. For such applications high deposition of the microcapsules are desirable.

SUMMARY OF THE INVENTION

This invention is based on the discovery that certain capsules can be chemically modified to improve deposition and olfactory intensity in consumer products.

Accordingly, one aspect of this invention relates to a method of preparing a microcapsule composition. The method includes the steps of: (a) providing a microcapsule slurry containing a plurality of microcapsules, in which each microcapsule has a microcapsule core and a microcapsule wall encapsulating the microcapsule core, and the microcapsule wall, having an inner surface and an outer surface, is formed of an encapsulating polymer having a primary or secondary amine group, (b) providing a deposition agent having a reactive group, and (c) forming a covalent bond between the primary or secondary amine group and the reactive group to graft the deposition agent to the encapsulating polymer on the outer surface of the microcapsule wall to obtain a surface-modified microcapsule.

In this method, the deposition agent contains a quaternary ammonium moiety, an oxoimidazolidinyl moiety, a catechol moiety, a carboxylic moiety, an alkyl moiety, or a combination thereof, and the microcapsule core contains a fragrance. Examples of the deposition agent include glycidyl trimethylammonium salt, N-(2-(2-oxoimidazolidin-1-yl) ethyl) methacryl-amide, N-(2-(2-oxoimidazolidin-1-yl) ethyl) acrylamide, N-(3,4-dihydroxyphenethyl) methacryl-amide, 3,4-dihydroxybenzaldehyde, [3-(methacryloylamino) propyl] trimethylammonium chloride, (3-Acrylamidopropyl)trimethylammonium, and any combinations thereof.

In some embodiments, the reactive group is an epoxy group, an acryloyl group, a methacryloyl group, or an aldehyde group.

In other embodiments, the encapsulating polymer is a polyurea polymer obtained from the reaction of a polyisocyanate and a polyamine. Preferred polyamines include a branched polyethyleneimine, linear polyethyleneimine, polyvinylamine, amine-modified polyvinylamine, amodimethicone, and any combination thereof.

The encapsulating polymer can also be a melamine-formaldehyde polymer, polyacrylate polymer, or silica polymer.

In any of the method described above, the microcapsule slurry preferably contains a free branched polyethyleneimine, with which the deposition agent is reacted to form a modified polyethyleneimine.

Optionally, the microcapsule core further contains a pro-fragrance, flavor, malodor counteractive agent, vitamin or derivative thereof, anti-inflammatory agent, fungicide, anesthetic, analgesic, antimicrobial active, anti-viral agent, anti-infectious agent, anti-acne agent, skin lightening agent, insect repellant, animal repellent, vermin repellent, emollient, skin moisturizing agent, wrinkle control agent, UV protection agent, fabric softener active, hard surface cleaning active, skin or hair conditioning agent, flame retardant, antistatic agent, nanometer to micron size inorganic solid, polymeric or elastomeric particle, taste modulator, cell, probiotic, or a combination thereof.

Another aspect of this invention relates to microcapsule compositions prepared by any of the methods described above. These microcapsule compositions can further comprise a free deposition aid selected from the group consisting of polyquaternium-4, polyquaternium-5, polyquaternium-6, polyquaternium-7, polyquaternium-10, polyquaternium-16, polyquaternium-22, polyquaternium-24, polyquaternium-28, polyquaternium-39, polyquaternium-44, polyquaternium-46, polyquaternium-47, polyquaternium-53, polyquaternium-55, polyquaternium-67, polyquaternium-68, polyquaternium-69, polyquaternium-73, polyquaternium-74, polyquaternium-77, polyquaternium-78, polyquaternium-79, polyquaternium-80, polyquaternium-81, polyquaternium-82, polyquaternium-86, polyquaternium-88, polyquaternium-101, polyvinylamine, polyethyleneimine, polyvinylamine and vinylformamide copolymer, and combinations thereof. Unlike the deposition agent, each of these free deposition aids is standalone in the microcapsule composition and is not covalently attached to the surface of the microcapsule.

A further aspect of this invention relates to a surface-modified microcapsule comprising a microcapsule core and a microcapsule wall encapsulating the microcapsule core, in which the microcapsule core contains a fragrance, the microcapsule wall is formed of a polyurea polymer and has an inner surface and outer surface, the inner surface is in contact with the microcapsule core, the outer surface has one or more deposition groups attached to the outer surface each via a covalent bond, and each of the deposition groups, independently, contains a quaternary ammonium moiety, an oxoimidazolidinyl moiety, a catechol moiety, a carboxylic acid moiety, or an alkyl moiety. The covalent bond can be an amine bond (N—C), an imine bond (N═C), an ether bond (O—C), an amide bond (—C(O)N—), or an ester bond (—C(O)O—).

The surface-modified microcapsule typically has a size varying from 0.1 microns to 1000 microns in diameter. The preferred polyurea polymer is the reaction product of a branched polyethyleneimine and a polyisocyanate. Exemplary polyisocyanates include a trimer of hexamethylene diisocyanate, a trimer of isophorone diisocyanate, a biuret of hexamethylene diisocyanate, a polyisocyanurate of toluene diisocyanate, a trimethylol propane-adduct of toluene diisocyanate, a trimethylol propane-adduct of xylylene diisocyanate, and combinations thereof.

The surface-modified microcapsule optionally further comprises a capsule formation aid selected from the group consisting of a polyvinyl alcohol, amine-modified polyvinylamine, polystyrene sulfonate, carboxymethyl cellulose, polysaccharide, quaternized polysaccharide, amodimethicone, naphthalene sulfonate condensate salt, polyvinylpyrrolidone, copolymer of vinyl pyrrolidone and quaternized dimethylaminoethyl methacrylate, and combinations thereof. In addition, the active material can further contain a pro-fragrance, flavor, malodor counteractive agent, vitamin or derivative thereof, anti-inflammatory agent, fungicide, anesthetic, analgesic, antimicrobial active, anti-viral agent, anti-infectious agent, anti-acne agent, skin lightening agent, insect repellant, animal repellent, vermin repellent, emollient, skin moisturizing agent, wrinkle control agent, UV protection agent, fabric softener active, hard surface cleaning active, skin or hair conditioning agent, flame retardant, antistatic agent, nanometer to micron size inorganic solid, polymeric or elastomeric particle, taste modulator, cell, probiotic, or a combination thereof.

Also within the scope of this invention is a method of preparing a modified polyethyleneimine comprising the steps of: (a) provide a polyethyleneimine containing a primary or secondary amine group, (b) provide a deposition agent having a reactive group, and (c) forming a covalent bond between the primary or secondary amine group and the reactive group to graft the deposition agent to the polyethyleneimine, in which the deposition agent and the reactive group are defined above. The polyethyleneimines useful in this invention include a branched polyethyleneimines and linear polyethyleneimines.

Still within the scope of this invention is a modified polyethyleneimine prepared by the method described above. In some embodiments, the modified polyethyleneimine has a branched or linear polyethyleneimine backbone and a deposition moiety, wherein the deposition moiety is connected to the polyethylene backbone via a covalent bond, and the deposition moiety is defined above.

This invention also provides a microcapsule composition comprising a microcapsule and a modified polyethyleneimine.

Also included in this invention are consumer products containing any of the microcapsule compositions described above. Exemplary consumer products include a shampoo, a hair conditioner, a hair rinse, a hair refresher, a hair fixative or styling aid, a hair bleach, a hair dye or colorant, a soap, a body wash, a cosmetic preparation, an all-purpose cleaner, a bathroom cleaner, a floor cleaner, a window cleaner, a bath tissue, a paper towel, a disposable wipe, a diaper rash cream or balm, a baby powder, a diaper, a bib, a baby wipe, an oral care product, a tooth paste, an oral rinse, an tooth whitener, a denture adhesive, a chewing gum, a breath freshener, an orally dissolvable strips, a chewable candy, a hard candy, a hand sanitizer, an anti-inflammatory balm, an anti-inflammatory ointment, an anti-inflammatory spray, a health care device, a dental floss, a toothbrush, a tampon, a feminine napkin, a personal care product, a sunscreen lotion, a sunscreen spray, a wax-based deodorant, a glycol type deodorant, a soap type deodorant, a facial lotion, a body lotion, a hand lotion, a body powder, a shave cream, a bath soak, an exfoliating scrub, a foot cream, a facial tissue, a cleansing wipe, a fabric care product, a fabric softener, a fabric refresher, an ironing water, a liquid laundry detergent, a liquid dish detergent, an automatic dish detergent, a unit dose tablet or capsule, a scent booster, a drier sheet, a fine fragrance, a solid perfume, a powder foundation, a liquid foundation, an eye shadow, a lipstick or lip balm, an Eau De Toilette product, a deodorant, a rug deodorizer, a candle, a room deodorizer, a disinfectant, an anti-perspirant, an roll-on product, and an aerosol product.

The details of one or more embodiments of the invention are set forth in the description below. Other features, objects, and advantages of the invention will be apparent from the description and the claims.

DETAILED DESCRIPTION OF THE INVENTION

It has been found that certain surface-modified microcapsules have unexpectedly high deposition on hard surfaces such as skin, hair, cloth, furniture, etc. These surface-modified microcapsules have been successfully incorporated into many consumer applications.

Exemplary applications include personal hair care products such as shampoos and hair conditioners; personal washes such as soaps, body wash, personal cleaners, and sanitizers; fabric care such as fabric refreshers, softeners, and dryer sheets; ironing water; industrial cleaners; liquid and powder detergent; rinse conditioners; fine fragrances; an Eau De Toilette product; a deodorant; an roll-on product; and an aerosol product. The surfaced-modified microcapsules of this invention are also well-suited for use in hydroalcoholic medium such as fine fragrance and for use in leave-on personal care applications.

The surface-modified microcapsules of this invention each have a microcapsule core and a microcapsule wall encapsulating the microcapsule core.

The microcapsule core contains an active material (e.g., a fragrance).

The microcapsule wall is formed of a polyurea polymer and has an inner surface and outer surface. The inner surface is in contact with the microcapsule core. The outer surface has one or more deposition groups attached to the outer surface each via a covalent bond. Each of the deposition groups, independently, contains a quaternary ammonium moiety, an oxoimidazolidinyl moiety, a catechol moiety, a carboxylic acid moiety, or an alkyl moiety.

The surface-modified microcapsules of this invention each have a particle size (in diameter) of 0.1 microns to 1000 microns (e.g., 0.5 microns to 500 microns, 1 micron to 200 microns, and 1 micron to 100 microns) with a lower limit of 0.1 microns, 0.5 microns, 1 micron, 2 microns, and 5 microns and an upper limit of 1000 microns, 500 microns, 200 microns, 100 microns, 75 microns, 50 microns, and 30 microns.

The surface-modified microcapsules can be positively charged with a zeta potential of at least 10 mV (e.g., 25 mV or greater, 40 mV or greater, 25-200 mV, and 40-100 mV). Not to be bound by theory, the microcapsules thus modified unexpectedly have a strong affinity to specific animate and inanimate surfaces (e.g., hair and fabric), and also are stable in consumer product bases such as hair conditioners, shampoos, shower gels, and fabric conditioners.

The surface-modified microcapsules of this invention can be prepared by a method including the following step: (a) providing a microcapsule slurry containing a plurality of microcapsules, in which each microcapsule has a microcapsule core and a microcapsule wall encapsulating the microcapsule core, and the microcapsule wall, having an inner surface and an outer surface, is formed of an encapsulating polymer having a primary or secondary amine group, (b) providing a deposition agent having a reactive group, and (c)

forming a covalent bond between the primary or secondary amine group and the reactive group to graft the deposition agent to the encapsulating polymer on the outer surface of the microcapsule wall to obtain a surface-modified microcapsule, wherein the deposition agent is defined above, and the microcapsule core contains a fragrance.

The microcapsule slurry can be prepared by reacting (e.g., via an interfacial polymerization) a polyfunctional nucleophile and a polyfunctional electrophile in the presence of a capsule formation aid (e.g., a dispersant) and/or a catalyst (e.g., a base) so that an active material is encapsulated in the oil core by the microcapsule wall. The oil core optionally contains a core modifier. The microcapsule wall is formed of an encapsulating polymer that is the reaction product of a polyfunctional nucleophile and a polyfunctional electrophile. Preferably, the encapsulating polymer is a reaction product of a branched polyethyleneimine (a polyfunctional nucleophile) and an aromatic/aliphatic polyisocyanate (a polyfunctional electrophile).

Polyfunctional Nucleophile.

The polyfunctional nucleophile is a branched polyethyleneimine or a mixture containing a branched polyethyleneimine and a polyfunctional amine/alcohol. In a preferred embodiment, the polyfunctional nucleophile is a branched polyethyleneimine.

Suitable branched polyethyleneimines each have a molecular weight (e.g., weight average molecular weight, Mw) of 200 to 1,000,000 (e.g., 300 to 500,000, 500 to 200,000, 750 to 100,000, and 750 to 50,000). The average molecular weight range can be determined by light scattering as described in Barth H. G. and Mays J. W. Chemical Analysis Vol 113, "Modern Methods of Polymer Characterization."

The branched polyethyleneimines have a main chain and one or more side chains attached to the main chain. The main chain has 2 to 25,000 (e.g., 3 to 10,000, 5 to 5000, and 5 to 500) repeat ethylene amine ($-CH_2CH_2NH-$) units. The side chains each have one or more ethylene amine terminals ($-CH_2CH_2NH_2$). The representative structure of the branched polyethyleneimine is shown below:

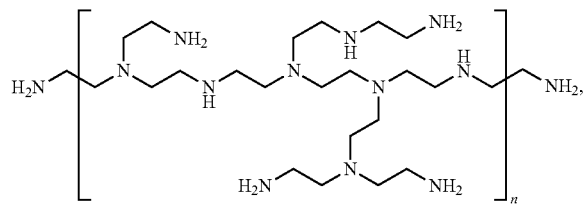

in which n is 1 to 5000 (e.g., 1 to 2000, 1 to 1000, and 1 to 100).

Other suitable polyfunctional nucleophiles include polyfunctional amines, (e.g., polyamines, amphoteric amines, amino acids, peptides, and proteins) and polyfunctional alcohols (e.g., polyols).

Polyfunctional amines are those having at least a primary or secondary amine group ($-NH_2$ and $-NH-$) and one or more additional functional groups such as a primary or secondary amine and hydroxyl group ($-OH$). Exemplary polyfunctional amines include hexamethylene-diamine, hexaethylenediamine, ethylenediamine, 1,3-diaminopropane, 1,2-diaminopropane, 1,4-diaminobutane, diethylenetriamine, pentaethylenehexamine, bis(3-aminopropyl)amine, bis(hexanethylene)triamine, tris(2-aminoethyl)amine, triethylenetetramine, N,N'-bis(3-aminopropyl)-1,3-propanediamine, N,N,N',N'-tetrakis(2-hydroxyethyl) ethylene diamine, N,N,N',N'-tetrakis(2-hydroxypropyl) ethylene diamine, 2,4-diamino-6-hydroxypyrimidine, 2,4,6-triaminopyrimidine, tetraethylenepentamine, amino-2-methyl-1-propanol, a second branched polyethylenimine, and chitosan. Guanidine amines and guanidine salts are yet another class of multi-functional amines of use in this invention. Exemplary guanidine amines and guanidine salts include, but are not limited to, 1,3-diaminoguanidine and its monohydrochloride, 1,1-dimethylbiguanide and its hydrochloride, guanidine carbonate, and guanidine hydrochloride.

Suitable polyamines contain two or more amine groups such as $-NH_2$ and $-R^*NH$, $R^*$ being substituted and unsubstituted $C_1$-$C_{20}$ alkyl, $C_1$-$C_{20}$ heteroalkyl, $C_1$-$C_{20}$ cycloalkyl, 3- to 8-membered heterocycloalkyl, aryl, and heteroaryl. These polyamines include polyalkylene polyamines and polyetheramines as described in WO 2015/023961 A1.

Amphoteric amines, i.e., amines that can react as an acid and a base, are another class of amines of use in this invention. Examples include proteins and amino acids such as L-lysine, D-lysine, L-arginine, D-arginine, L-lysine monohydrochloride, D-lysine monohydro-chloride, L-arginine monohydrochloride, D-arginine monohydrochloride, histidine, L-ornithine monohydrochloride, D-ornithine monohydrochloride, nisin, gelatin, and mixtures thereof.

Commercially available examples of amines include products sold under the trademarks of JEFFAMINE® EDR-148 (where x=2), JEFFAMINE® EDR-176 (where x=3) (from Huntsman). Other polyether amines include the JEFFAMINE® ED Series, JEFFAMINE® TRIAMINES, polyethylenimines from BASF (Ludwigshafen, Germany) under the trademark of LUPASOL® (e.g., Lupasol® FG, Lupasol® G20 waterfree, Lupasol® PR 8515, Lupasol® WF, Lupasol® FC, Lupasol® G20, Lupasol® G35, Lupasol® G100, Lupasol® G500, Lupasol® HF, Lupasol® PS, Lupasol® HEO 1, Lupasol® PN50, Lupasol® PN60, Lupasol® P0100 and Lupasol® SK). Other commercially available polyethylenimines include products sold under the trademarks of EPOMIN® P-1000, EPOMIN® P-1050, EPOMIN® RP18W and EPOMIN® PP-061 from NIPPON SHOKUBAI (New York, NY). Polyvinylamines such as those sold by BASF under the trademark of LUPAMINE® can also be used. A wide range of polyetheramines may be selected by those skilled in the art.

Polyfunctional alcohols are those having two or more hydroxyl groups. Non-limiting examples are pentaerythritol, glucose, 2-aminoethanol, dipentaerythritol, glycerol, polyglycerol, ethylene glycol, hexylene glycol, polyethylene glycol, trimethylolpropane, neopentyl glycol, sorbitol, erythritol, threitol, arabitol, xylitol, ribitol, mannitol, galactitol, fucitol, iditol, inositol, volemitol, isomalt, maltitol, lactitol, maltotriitol, maltotetraitol, polyglycitol, and combinations thereof. More suitable polyfunctional alcohols are described in WO 2015/023961 A1.

The polyfunctional nucleophile as used in this invention can be a single compound (e.g., a branched polyethyleneimine) or a mixture of two or more polyfunctional amines (e.g., a branched polyethyleneimine with one or more polyfunctional amines/alcohols).

The range of polyfunctional nucleophile content can vary from 0.1% to 15% (e.g., 0.2% to 10%, 0.5% to 8%, 1% to 8%, and 2% to 6%) by weight of the microcapsule. When the microcapsule is incorporated in a microcapsule composition, the polyfunctional nucleophile is present at a level of 0.05% to 8% (e.g., 0.1% to 5%, 0.1% to 4%, 0.25% to 4%, and 0.25% to 3%) by weight of the microcapsule composition.

In one embodiment, the polyfunctional nucleophile is added to the polymerization reaction at a temperature of 0° C. to 55° C. (e.g., 10-50° C., 15-45° C., 20-40° C., and 25-35° C.).

Polyfunctional Electrophiles

The polyfunctional electrophile has at least two electrophilic functional groups reactive towards the branched polyethyleneimine, the polyfunctional amine, or the polyfunctional alcohol to form a network of the encapsulating polymer. Examples of the electrophilic group include formyl, keto, carboxyl, an isocyanate group, a carboxylate ester group, an acyl halide group, an amide group, a carboxylic anhydride group, an alkyl halide group, an epoxide group, an aziridine group, an oxetane group, an azetidine group, a sulfonyl halide group, a chlorophosphate group, an α,β-unsaturated carbonyl group, an α,β-unsaturated nitrile group, a trifluoromethane-sulfonate group, a p-toluenesulfonate group, and an α,β-unsaturated methanesulfonyl group.

Suitable polyfunctional electrophiles include glutaric dialdehyde, succinic dialdehyde, and glyoxal; as well as compounds such as glyoxyl trimer and paraformaldehyde, bis(dimethyl) acetal, bis(diethyl) acetal, polymeric dialdehydes, such as oxidized starch. Other suitable polyfunctional electrophiles are a low molecular weight, difunctional aldehyde, such as glyoxal, 1,3-propane dialdehyde, 1,4-butane dialdehyde, 1,5-pentane dialdehyde, or 1,6-hexane.

Preferably, the polyfunctional electrophiles are polyfunctional isocyanates (i.e., polyisocyanates), each of which contains two or more isocyanate (—NCO) groups. These polyisocyanates can be aromatic, aliphatic, linear, branched, or cyclic. In some embodiments, the polyisocyanate contains, on average, 2 to 4 isocyanate groups. In particular embodiments, the polyisocyanate contains at least three isocyanate functional groups. In certain embodiments, the polyisocyanate is water insoluble.

In particular embodiments, the polyisocyanate used in this invention is an aromatic polyisocyanate. Desirably, the aromatic polyisocyanate includes a phenyl, tolyl, xylyl, naphthyl or diphenyl moiety as the aromatic component. In certain embodiments, the aromatic polyisocyanate is a polyisocyanurate of toluene diisocyanate, a trimethylol propane-adduct of toluene diisocyanate or a trimethylol propane-adduct of xylylene diisocyanate.

One class of suitable aromatic polyisocyanates are those having the generic structure shown below, and its structural isomers

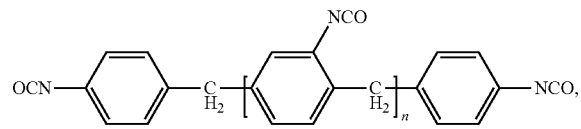

wherein n can vary from zero to a desired number (e.g., 0-50, 0-20, 0-10, and 0-6) depending on the type of polyamine or polyol used. Preferably, the number of n is limited to less than 6. The starting polyisocyanate may also be a mixture of polyisocyanates where the value of n can vary from 0 to 6. In the case where the starting polyisocyanate is a mixture of various polyisocyanates, the average value of n preferably falls in between 0.5 and 1.5. Commercially-available polyisocyanates include products sold under the trademarks of LUPRANATE® M20 (chemical name: polymeric methylene diphenyl diisocyanate, i.e., "PMDI"; commercially available from BASF containing isocyanate group "NCO" 31.5 wt %), where the average n is 0.7; PAPI® 27 (PMDI commercially available from Dow Chemical having an average molecular weight of 340 and containing NCO 31.4 wt %) where the average n is 0.7; MONDUR® MR (PMDI containing NCO at 31 wt % or greater, commercially available from Covestro, Pittsburgh, Pennsylvania) where the average n is 0.8; MONDUR® MR Light (PMDI containing NCO 31.8 wt %, commercially available from Covestro) where the average n is 0.8; MONDUR® 489 (PMDI commercially available from Covestro containing NCO 30-31.4 wt %) where the average n is 1; poly[(phenylisocyanate)-co-formaldehyde](Aldrich Chemical, Milwaukee, WI), other isocyanate monomers such as products under the trademarks DESMODUR® N3200 (poly (hexamethylene diisocyanate) commercially available from Covestro), Takenate™ D-110N (trimethylol propane-adduct of xylylene diisocyanate, Mitsui Chemicals America, Inc., Rye Brook, NY, containing NCO 11.5 wt %), DESMODUR® L75 (a polyisocyanate base on toluene diisocyanate commercially available from Covestro), and DESMODUR® IL (another polyisocyanate based on toluene diisocyanate commercially available from Covestro).

The structures of certain commercially available polyisocyanates of the invention are shown below:

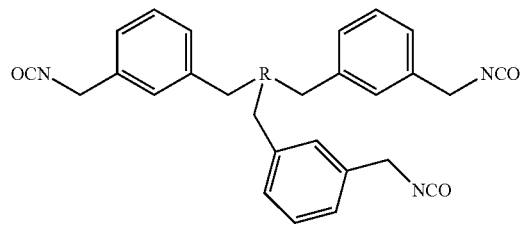

or its structural isomer. R can be a $C_1$-$C_{10}$ alkyl, $C_1$-$C_{10}$ ester, or an isocyanurate. Representative polyisocyanates of this structure are products sold under the trademarks of Takenate™ D-110N (Mitsui), DESMODUR® L75 (Covestro), and DESMODUR® IL (Covestro).

Polyisocyanate such as product under the trademark of Takenate™ D-110N and other polyisocyanates are commercially available, typically in an ethyl acetate solution. Preferably, ethyl acetate is replaced with a solvent having a high flash point (e.g., at least 100° C., at least 120° C., and at least 150° C.). Suitable solvents include triacetin, triethyl citrate, ethylene glycol diacetate, benzyl benzoate, and combinations thereof.

As an illustration, the commercial product under trademark Takenate™ D-110N (a trimethylol propane-adduct of xylylene diisocyanate solution in ethyl acetate) is combined with benzyl benzoate and vacuum distilled to remove ethyl acetate to obtain a polyisocyanate solution containing about 59% of the trimethylol propane-adduct of xylylene diisocyanate solution and 41% of benzyl benzoate. This polyisocyanate solution has a flash point of at least 60° C. This polyisocyanate solution in benzyl benzoate, together with polyvinylpyrrolidone (PVP)/polyquaternium-11 (PQ-11) or polystyrene sulfonate/carboxymethyl cellulose (CMC), can be used to prepare the microcapsule composition of this invention.

Other examples of the aromatic polyisocyanate include 1,5-naphthylene diisocyanate, 4,4'-diphenylmethane diisocyanate (MDI), hydrogenated MDI (H12MDI), xylylene diisocyanate (XDI), tetramethylxylol diisocyanate (TMXDI), 4,4'-diphenyldimethylmethane diisocyanate, diand tetraalkyldiphenylmethane diisocyanate, 4,4'-dibenzyl diisocyanate, 1,3-phenylene diisocyanate, 1,4-phenylene diisocyanate, the isomers of tolylene diisocyanate (TDI), 4,4'-diisocyanatophenylperfluoroethane, phthalic acid bisisocyanatoethyl ester, also polyisocyanates with reactive halogen atoms, such as 1-chloromethylphenyl 2,4-diisocyanate, 1-bromomethyl-phenyl 2,6-diisocyanate, and 3,3-bis-chloromethyl ether 4,4'-diphenyldiisocyanate, and combinations thereof.

In other particular embodiments, the polyisocyanate is an aliphatic polyisocyanate such as a trimer of hexamethylene diisocyanate, a trimer of isophorone diisocyanate, and a biuret of hexamethylene diisocyanate. Exemplary aliphatic polyisocyanates include those commercially available, e.g., under the trademarks of BAYHYDUR® N304 and BAYHYDUR® N305, which are aliphatic water-dispersible polyisocyanates based on hexamethylene diisocyanate; DESMODUR® N3600, DESMODUR® N3700, and DESMODUR® N3900, which are low viscosity, polyfunctional aliphatic polyisocyanates based on hexamethylene diisocyanate; and DESMODUR® 3600 and DESMODUR® N100 which are aliphatic polyisocyanates based on hexamethylene diisocyanate, each of which is available from Covestro, Pittsburgh, PA). More examples include 1-methyl-2,4-diisocyanatocyclohexane, 1,6-diisocyanato-2,2,4-trimethylhexane, 1,6-diisocyanato-2,4,4-trimethylhexane, 1-isocyanatomethyl-3-isocyanato-1,5,5-trimethylcyclohexane, chlorinated and brominated diisocyanates, phosphorus-containing diisocyanates, tetramethoxybutane 1,4-diisocyanate, butane 1,4-diisocyanate, hexane 1,6-diisocyanate (HDI), dicyclohexylmethane diisocyanate, cyclohexane 1,4-diisocyanate, ethylene diisocyanate, and combinations thereof. Sulfur-containing polyisocyanates are obtained, for example, by reacting hexamethylene diisocyanate with thiodiglycol or dihydroxydihexyl sulfide. Further suitable diisocyanates are trimethylhexamethylene diisocyanate, 1,4-diisocyanatobutane, 1,2-diisocyanatododecane, dimer fatty acid diisocyanate, and combinations thereof.

The weight average molecular weight of polyisocyanates useful in this invention varies from 250 Daltons to 1000 Daltons and preferable from 275 Daltons to 500 Daltons.

The range of the polyfunctional electrophile (e.g., the polyisocyanate) content can vary from 0.2% to 40% (e.g., 0.4% to 35%, 0.5% to 30%, 1% to 25%, 2% to 25%, and 5% to 20%) by weight of the microcapsule. When the microcapsule is incorporated in a microcapsule composition, the amount of the polyisocyanate varies from 0.1% to 20%, preferably from 0.1% to 15%, more preferably from 0.2% to 10%, and even more preferably from 1.5% to 3.5%, all based on the total capsule composition.

In some embodiments, the polyfunctional isocyanate used in the preparation of the microcapsules of this invention is a single polyisocyanate. In other embodiments the polyisocyanate is a mixture of polyisocyanates. In some embodiments, the mixture of polyisocyanates includes an aliphatic polyisocyanate and an aromatic polyisocyanate. In particular embodiments, the mixture of polyisocyanates is a biuret of hexamethylene diisocyanate and a trimethylol propane-adduct of xylylene diisocyanate. In certain embodiments, the polyisocyanate is an aliphatic isocyanate or a mixture of aliphatic isocyanate, free of any aromatic isocyanate. In other words, in these embodiments, no aromatic isocyanate is used to prepare the polyurea/polyurethane polymers as capsule wall materials.

More examples of suitable polyisocyanates can be found in WO 2004/054362 and WO 2017/192648.

Capsule Formation Aids

The microcapsule composition is typically prepared in the presence of a capsule formation aid, which can be a surfactant or dispersant. Capsule formation aids also improve the performance of the microcapsule composition. Performance is measured by the intensity of the fragrance released during certain stages, e.g., the pre-rub and post-rub phases in laundry applications. The pre-rub phase is the phase when the capsules have been deposited on the cloth, e.g., after a wash cycle using a capsule-containing fabric softener or detergent. The post-rub phase is after the capsules have been deposited and are broken by friction or other similar mechanisms.

In some embodiments, the capsule formation aid is a protective colloid or emulsifier including, e.g., maleic-vinyl copolymers such as the copolymers of vinyl ethers with maleic anhydride or acid, sodium lignosulfonates, maleic anhydride/styrene copolymers, ethylene/maleic anhydride copolymers, and copolymers of propylene oxide and ethylene oxide, polyvinylpyrrolidone (PVP), polyvinyl alcohols (PVA), sodium salt of naphthalene sulfonate condensate, carboxymethyl cellulose (CMC), fatty acid esters of polyoxyethylenated sorbitol, sodium dodecylsulfate, and combinations thereof. The concentration of the capsule formation aid (e.g., the surfactant and dispersant) varies from 0.1% to 5% (e.g., 0.2% to 4%, 0.5% to 4%, 0.5% to 2.5%, and 1% to 2%) by weight of the capsule composition.

Commercially available surfactants include, but are not limited to, sulfonated naphthalene-formaldehyde condensates such as the product under the trademark of MORWET® D-425 (sodium salt of alkylnaphthalenesulfonate formaldehyde condensate, commercially available from Akzo Nobel, Fort Worth, Texas); partially hydrolyzed polyvinyl alcohols such as the product under the trademark of MOWIOL®, e.g., MOWIOL 3-83 (commercially available from Kuraray, Houston, Texas); ethylene oxide-propylene oxide block copolymers or poloxamers such as the products under the trademarks of PLURONIC®, SYNPERONIC® or PLURACARE® materials (BASF); sulfonated polystyrenes such as the product sold under the trademark of FLEXAN® II (Akzo Nobel); ethylene-maleic anhydride polymers such as the product sold under the trademark of ZEMAC® (Vertellus Specialties Inc., Indianapolis, Indiana); and Polyquaternium series such as Polyquaternium-11 ("PQ11;" a copolymer of vinyl pyrrolidone and quaternized dimethylaminoethyl methacrylate; sold by BASF under the trademark of LUVIQUAT® PQ11 AT 1).

Processing aids can also be used as capsule formation aids. They include hydrocolloids, which improve the colloidal stability of the slurry against coagulation, sedimentation and creaming. The term "hydrocolloid" refers to a broad class of water-soluble or water-dispersible polymers having anionic, cationic, zwitterionic or non-ionic character. Hydrocolloids useful in the present invention include, but are not limited to, polycarbohydrates, such as starch, modified starch, dextrin, maltodextrin, and cellulose derivatives, and their quaternized forms; natural gums such as alginate esters, carrageenan, xanthanes, agar-agar, pectines, pectic acid, and natural gums such as gum arabic, gum tragacanth and gum karaya, guar gums and quaternized guar gums; gelatine, protein hydrolysates and their quaternized forms; synthetic polymers and copolymers, such as poly(vinyl pyrrolidone-co-vinyl acetate), poly(vinyl alcohol-co-vinyl acetate), poly((met)acrylic acid), poly(maleic acid), poly(alkyl(meth) acrylate-co-(meth)acrylic acid), poly(acrylic acid-co-maleic acid)copolymer, poly(alkyleneoxide), poly(vinyl-methylether), poly(vinylether-co-maleic anhydride), and the like, as well as poly-(ethyleneimine), poly((meth)acrylamide), poly (alkyleneoxide-co-dimethylsiloxane), poly(amino dimethylsiloxane), and the like, and their quaternized forms.

The capsule formation aid may also be used in combination with carboxymethyl cellulose ("CMC"), polyvinylpyrrolidone, polyvinyl alcohol, alkylnaphthalenesulfonate formaldehyde condensates, and/or a surfactant during processing to facilitate capsule formation. Examples of these surfactants include cetyl trimethyl ammonium chloride (CTAC), poloxamers such as commercial products available under the trademarks PLURONICS® (e.g., PLURONIC® F127), PLURAFAC® (e.g., PLURAFAC® F127), or MIRANET-N®, saponins such as QNATURALE® (National Starch Food Innovation); or a gum Arabic such as Seyal or Senegal. In certain embodiments, the CMC polymer has a molecular weight (e.g., weight average molecular weight) range between 90,000 Daltons to 1,500,000 Daltons, preferably between 250,000 Daltons to 750,000 Daltons and more preferably between 400,000 Daltons to 750,000 Daltons. The CMC polymer has a degree of substitution between 0.1 to 3, preferably between 0.65 to 1.4, and more preferably between 0.8 to 1. The CMC polymer is present in the capsule slurry at a level from 0.1% to 2% and preferably from 0.3% to 0.7%. In other embodiments, polyvinylpyrrolidone used in this invention is a water-soluble polymer and has a molecular weight (e.g., weight average molecular weight) of 1,000 Daltons to 10,000,000 Daltons. Suitable polyvinylpyrrolidones are polyvinylpyrrolidones K12, K15, K17, K25, K30, K60, K90, or a mixture thereof. The amount of the polyvinylpyrrolidone is 2% to 50%, 5% to 30%, or 10% to 25% by weight of the microcapsule composition.

Catalysts

Catalysts suitable for use in the invention are metal carbonates, metal hydroxide, amino or organometallic compounds and include, for example, sodium carbonate, cesium carbonate, potassium carbonate, lithium hydroxide, 1,4-diazabicyclo[2.2.2]octane (i.e., DABCO), N,N-dimethylaminoethanol, N,N-dimethylcyclohexylamine, bis-(2-dimethylaminoethyl) ether, N,N dimethylacetylamine, stannous octoate, and dibutyltin dilaurate.

Other Encapsulating Polymers

The microcapsule composition of this invention optionally has a second, third, fourth, fifth, or sixth microcapsule each formed of an encapsulating polymer selected from the group consisting of a sol-gel polymer (e.g., silica), polyacrylate, polyacrylamide, poly(acrylate-co-acrylamide), polyurea, polyurethane, starch, gelatin and gum Arabic, poly(melamine-formaldehyde), poly(urea-formaldehyde), and combinations thereof. A branched polyethyleneimine and its derivatives can also be coated onto the microcapsule wall to prepare a microcapsule having a positive zeta potential.

These encapsulating polymers are described in detail below.

Sol-gel Microcapsules. These microcapsules have a microcapsule wall formed of a sol-gel polymer, which is a reaction product of a sol-gel precursor via a polymerization reaction (e.g., hydrolyzation). Suitable sol-gel precursors are compounds capable of forming gels such as compounds containing silicon, boron, aluminum, titanium, zinc, zirconium, and vanadium. Preferred precursors are organosilicon, organoboron, and organoaluminum including metal alkoxides and b-diketonates.

Sol-gel precursors suitable for the purposes of the invention are selected in particular from the group of di-, tri- and/or tetrafunctional silicic acid, boric acid and alumoesters, more particularly alkoxysilanes (alkyl orthosilicates), and precursors thereof.

One example of sol-gel precursors suitable for the purposes of the invention are alkoxysilanes corresponding to the following general formula:

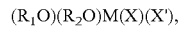

$(R_1O)(R_2O)M(X)(X')$, wherein X can be hydrogen or $-OR_3$; X' can be hydrogen or $-OR_4$; and $R_1$, $R_2$, $R_3$ and $R_4$ independently represent an organic group, more particularly a linear or branched alkyl group, preferably a $C_1$-$C_{12}$ alkyl. M can be Si, Ti, or Zr.

A preferred sol/gel precursor is alkoxysilanes corresponding to the following general formula: $(R_1O)(R_2O)Si(X)(X')$, wherein each of X, X', $R_1$, and $R_2$ are defined above.

Particularly preferred compounds are the silicic acid esters such as tetramethyl orthosilicate (TMOS) and tetraethyl orthosilicate (TEOS). A preferred compound includes the product under the trademark of Dynasylan® (organofunctional silanes commercially available from Degussa Corporation, Parsippany New Jersey, USA). Other sol-gel precursors suitable for the purposes of the invention are described, for example, in German Patent Application DE10021165. These sol-gel precursors are various hydrolyzable organosilanes such as, for example, alkylsilanes, alkoxysilanes, alkyl alkoxysilanes and organoalkoxysilanes. Besides the alkyl and alkoxy groups, other organic groups (for example allyl groups, aminoalkyl groups, hydroxyalkyl groups, etc.) may be attached as substituents to the silicon.

Recognizing that metal and semi metal alkoxide monomers (and their partially hydrolyzed and condensed polymers) such as tetramethoxy silane (TMOS), tetraethoxy silane (TEOS), etc. are very good solvents for numerous molecules and active ingredients is highly advantageous since it facilitates dissolving the active materials at a high concentration and thus a high loading in the final capsules.

Polyacrylate microcapsules, polyacrylamide microcapsules, and poly(acrylate-co-acrylamide) microcapsules. These microcapsules are prepared from corresponding precursors, which form the microcapsule wall. Preferred precursor are bi- or polyfunctional vinyl monomers including by way of illustration and not limitation, allyl methacrylate/acrylamide, triethylene glycol dimethacrylate/acrylamide, ethylene glycol dimethacrylate/acrylamide, diethylene glycol dimethacrylate/acrylamide, triethylene glycol dimethacrylate/acrylamide, tetraethylene glycol dimethacrylate/acrylamide, propylene glycol dimethacrylate/acrylamide, glycerol dimethacrylate/acrylamide, neopentyl glycol dimethacrylate/acrylamide, 1,10-decanediol dimethacrylate/acrylamide, pentaerythritol trimethacrylate/acrylamide, pentaerythritol tetramethacrylate/acrylamide, dipentaerythritol hexamethacrylate/acrylamide, triallyl-formal trimethacrylate/acrylamide, trimethylol propane trimethacrylate/acrylamide, tributanediol dimethacrylate/acrylamide, aliphatic or aromatic urethane diacrylates/acrylamides, difunctional urethane acrylates/acrylamides, ethoxylated aliphatic difunctional urethane methacrylates/acrylamides, aliphatic or aromatic urethane dimethacrylates/acrylamides, epoxy acrylates/acrylamides, epoxymethacrylates/acrylamides, 1,3-butylene glycol diacrylate/acrylamide, 1,4-butanediol dimethacrylate/acrylamide, 1,4-butaneidiol diacrylate/acrylamide, diethylene glycol diacrylate/acrylamide, 1,6-hexanediol diacrylate/acrylamide, 1,6-hexanediol dimethacrylate/acrylamide, neopentyl glycol diacrylate/acrylamide, polyethylene glycol diacrylate/acrylamide, tetraethylene glycol diacrylate/acrylamide, triethylene glycol diacrylate/acrylamide, 1,3-butylene glycol dimethacrylate/acrylamide, tripropylene glycol diacrylate/acrylamide, ethoxylated bisphenol diacrylate/acrylamide, ethoxylated bisphenol dimethylacrylate/acrylamide, dipropylene glycol diacrylate/acrylamide, alkoxylated hexanediol diacrylate/acrylamide, alkoxylated cyclohexane dimethanol diacrylate/acrylamide, propoxylated neopentyl glycol diacrylate/acrylamide, trimethylol-propane triacrylate/acrylamide, pentaerythritol triacrylate/acrylamide, ethoxylated trimethylolpropane triacrylate/acrylamide, propoxylated trimethylolpropane triacrylate/acrylamide, propoxylated glyceryl triacrylate/acrylamide, ditrimethyloipropane tetraacrylate/acrylamide, dipentaerythritol pentaacrylate/acrylamide, ethoxylated pentaerythritol tetraacrylate/acrylamide, PEG 200 dimethacrylate/acrylamide, PEG 400 dimethacrylate/acrylamide, PEG 600 dimethacrylate/acrylamide, 3-acryloyloxy glycol monoacrylate/acrylamide, triacryl formal, triallyl isocyanate, and triallyl isocyanurate.

The monomer is typically polymerized in the presence of an activation agent (e.g., an initiator) at a raised temperature (e.g., 30-90° C.) or under UV light. Exemplary initiators are 2,2'-azobis(isobutyronitrile) ("AIBN"), dicetyl peroxydicarbonate, di(4-tert-butylcyclohexyl) peroxydicarbonate, dioctanoyl peroxide, dibenzoyl peroxide, dilauroyl peroxide, didecanoyl peroxide, tert-butyl peracetate, tert-butyl perlaurate, tert-butyl perbenzoate, tert-butyl hydroperoxide, cumene hydroperoxide, cumene ethylperoxide, diisopropylhydroxy dicarboxylate, 2,2'-azobis(2,4-dimethylvaleronitrile), 1,1'-azobis-(cyclohexane-1-carbonitrile), dimethyl 2,2'-azobis(2-methylpropionate), 2,2'-azobis[2-methyl-N-(2-hydroxyethyl) propionamide, sodium persulfate, benzoyl peroxide, and combinations thereof.

Emulsifiers used in the formation of polyacrylate/polyacrylamide/poly(acrylate-co-acrylamide) capsule walls are typically anionic emulsifiers including by way of illustration and not limitation, water-soluble salts of alkyl sulfates, alkyl ether sulfates, alkyl isothionates, alkyl carboxylates, alkyl sulfosuccinates, alkyl succinamates, alkyl sulfate salts such as sodium dodecyl sulfate, alkyl sarcosinates, alkyl derivatives of protein hydrolyzates, acyl aspartates, alkyl or alkyl ether or alkylaryl ether phosphate esters, sodium dodecyl sulphate, phospholipids or lecithin, or soaps, sodium, potassium or ammonium stearate, oleate or palmitate, alkylarylsulfonic acid salts such as sodium dodecylbenzenesulfonate, sodium dialkylsulfosuccinates, dioctyl sulfosuccinate, sodium dilaurylsulfosuccinate, poly(styrene sulfonate) sodium salt, isobutylene-maleic anhydride copolymer, gum arabic, sodium alginate, carboxymethylcellulose, cellulose sulfate and pectin, poly(styrene sulfonate), isobutylene-maleic anhydride copolymer, gum arabic, carrageenan, sodium alginate, pectic acid, tragacanth gum, almond gum and agar; semi-synthetic polymers such as carboxymethyl cellulose, sulfated cellulose, sulfated methylcellulose, carboxymethyl starch, phosphated starch, lignin sulfonic acid; and synthetic polymers such as maleic anhydride copolymers (including hydrolyzates thereof), polyacrylic acid, polymethacrylic acid, acrylic acid butyl acrylate copolymer or crotonic acid homopolymers and copolymers, vinylbenzenesulfonic acid or 2-acrylamido-2-methylpropanesulfonic acid homopolymers and copolymers, and partial amide or partial ester of such polymers and copolymers, carboxymodified polyvinyl alcohol, sulfonic acid-modified polyvinyl alcohol and phosphoric acid-modified polyvinyl alcohol, phosphated or sulfated tristyrylphenol ethoxylates. The amount of anionic emulsifier is anywhere from 0.1 to 40 percent by weight of all constituents, more preferably from 0.5 to 10 percent, more preferably 0.5 to 5 percent by weigh.

Aminoplasts and Gelatin. A representative process used for aminoplast encapsulation is disclosed in U.S. Pat. No. 3,516,941 and US 2007/0078071, though it is recognized that many variations with regard to materials and process steps are possible. Another encapsulation process, i.e., gelatin encapsulation, is disclosed in U.S. Pat. No. 2,800,457. Both processes are discussed in the context of fragrance encapsulation for use in consumer products in U.S. Pat. Nos. 4,145,184 and 5,112,688 respectively. Polymer systems are well-known in the art and non-limiting examples of these include aminoplast capsules and encapsulated particles as disclosed in GB 2006709 A; the production of microcapsules having walls comprising styrene-maleic anhydride reacted with melamine-formaldehyde precondensates as disclosed in U.S. Pat. No. 4,396,670; an acrylic acid-acrylamide copolymer, cross-linked with a melamine-formaldehyde resin as disclosed in U.S. Pat. No. 5,089,339; capsules composed of cationic melamine-formaldehyde condensates as disclosed in U.S. Pat. No. 5,401,577; melamine formaldehyde microencapsulation as disclosed in U.S. Pat. No. 3,074,845; amido-aldehyde resin in-situ polymerized capsules disclosed in EP 0 158 449 A1; etherified urea-formaldehyde polymer as disclosed in U.S. Pat. No. 5,204,185; melamine-formaldehyde microcapsules as described in U.S. Pat. No. 4,525,520; cross-linked oil-soluble melamine-formaldehyde precondensate as described in U.S. Pat. No. 5,011,634; capsule wall material formed from a complex of cationic and anionic melamine-formaldehyde precondensates that are then cross-linked as disclosed in U.S. Pat. No. 5,013,473; polymeric shells made from addition polymers such as condensation polymers, phenolic aldehydes, urea aldehydes or acrylic polymer as disclosed in U.S. Pat. No. 3,516,941; urea-formaldehyde capsules as disclosed in EP 0 443 428 A2; melamine-formaldehyde chemistry as disclosed in GB 2 062 570 A; and capsules composed of polymer or copolymer of styrene sulfonic acid in acid of salt form, and capsules cross-linked with melamine-formaldehyde as disclosed in U.S. Pat. No. 4,001,140.

Urea-formaldehyde and melamine-formaldehyde Capsules. Urea-formaldehyde and melamine-formaldehyde precondensate capsule shell wall precursors are prepared by means of reacting urea or melamine with formaldehyde where the mole ratio of melamine or urea to formaldehyde is in the range of from 10:1 to 1:6, preferably from 1:2 to 1:5. For purposes of practicing this invention, the resulting material has a molecular weight in the range of from 156 to 3000. The resulting material may be used 'as-is' as a cross-linking agent for the aforementioned substituted or un-substituted acrylic acid polymer or copolymer or it may be further reacted with a $C_1$-$C_6$ alkanol, e.g., methanol, ethanol, 2-propanol, 3-propanol, 1-butanol, 1-pentanol or 1-hexanol, thereby forming a partial ether where the mole ratio of melamine/urea:formaldehyde:alkanol is in the range of 1:(0.1-6):(0.1-6). The resulting ether moiety-containing product may be used 'as-is' as a cross-linking agent for the aforementioned substituted or un-substituted acrylic acid polymer or copolymer, or it may be self-condensed to form dimers, trimers and/or tetramers which may also be used as cross-linking agents for the aforementioned substituted or un-substituted acrylic acid polymers or co-polymers. Methods for formation of such melamine-formaldehyde and urea-formaldehyde pre-condensates are set forth in U.S. Pat. No. 6,261,483, and Lee et al. (2002) J Microencapsulation 19, 559-569.

Examples of urea-formaldehyde pre-condensates useful in the practice of this invention are products sold under the trademarks of URAC® 180 and URAC® 186, Cytec Technology Corp. of Wilmington, DE. Examples of melamine-formaldehyde pre-condensates useful in the practice if this invention, include, but are not limited to, the products sold under the trademarks of CYMEL® U-60, CYMEL® U-64 and CYMEL® U-65 from Cytec Technology Corp. It is preferable to use, as the precondensate for cross-linking, the substituted or un-substituted acrylic acid polymer or co-polymer. In practicing this invention, the range of mole ratios of urea-formaldehyde precondensate/melamine-formaldehyde pre-condensate to substituted/un-substituted acrylic acid polymer/co-polymer is in the range of from 9:1 to 1:9, preferably from 5:1 to 1:5 and most preferably from 2:1 to 1:2.

In one embodiment of the invention, microcapsules with polymer(s) composed of primary and/or secondary amine reactive groups or mixtures thereof and cross-linkers can also be used. See US 2006/0248665. The amine polymers can possess primary and/or secondary amine functionalities and can be of either natural or synthetic origin. Amine-containing polymers of natural origin are typically proteins such as gelatin and albumen, as well as some polysaccharides. Synthetic amine polymers include various degrees of hydrolyzed polyvinyl formamides, polyvinylamines, polyallyl amines and other synthetic polymers with primary and secondary amine pendants. Examples of suitable amine polymers are the product sold under the trademark of LUPAMIJIN® series of polyvinyl formamides available from BASF. The molecular weights of these materials can range from 10,000 to 1,000,000.

Urea-formaldehyde or melamine-formaldehyde capsules can also include formaldehyde scavengers, which are capable of binding free formaldehyde. When the capsules are for use in aqueous media, formaldehyde scavengers such as sodium sulfite, melamine, glycine, and carbohydrazine are suitable. When the capsules are aimed to be used in products having low pH, e.g., fabric care conditioners, formaldehyde scavengers are preferably selected from beta diketones, such as beta-ketoesters, or from 1,3-diols, such as propylene glycol. Preferred beta-ketoesters include alkylmalonates, alkyl aceto acetates and polyvinyl alcohol aceto acetates.

The microcapsule composition of this invention optionally contains one or more additional microcapsules, e.g., a second, third, fourth, fifth, or sixth microcapsules. Each of these microcapsules can be any of the microcapsule described above.

These additional microcapsules can be any of the microcapsules described above but different from each other in term of the microcapsule size, the degree of polymerization, the degree of crosslinking, the encapsulating polymer, the thickness of the wall, the active material, the ratio between the wall material and the active material, the rupture force or fracture strength, and the like.

Active Materials

The core of the capsules of the invention can include one or more active materials including, but not limited to, flavors and/or fragrance ingredients such as fragrance oils. Individual active materials that can be encapsulated include those listed in WO 2016049456, pages 38-50. These active material include flavor or fragrance ingredients, taste masking agents, taste sensates, malodor counteracting agents, vitamins or derivatives thereof, antibacterials, sunscreen actives, antioxidants, anti-inflammatory agents, fungicide, anesthetics, analgesics, antifungal agents, antibiotics, anti-viral agents, anti-parasitic agents, anti-infectious, anti-acne agents, dermatological active ingredients, enzymes and co-enzymes, skin whitening agents, anti-histamines, chemotherapeutic agents, insect repellents, emollient, skin moisturizing agent, wrinkle control agent, UV protection agent, fabric softener active, hard surface cleaning active, skin or hair conditioning agent, animal repellent, vermin repellent, flame retardant, antistatic agent, nanometer to micron size inorganic solid, polymeric or elastomeric particle, and combination thereof.

In addition to the active materials listed above, the products of this invention can also contain, for example, the following dyes, colorants or pigments: lactoflavin (riboflavin), beta-carotene, riboflavin-5'-phosphate, alpha-carotene, gamma-carotene, cantaxanthin, erythrosine, curcumin, quinoline yellow, yellow orange S, tartrazine, bixin, norbixin (annatto, orlean), capsanthin, capsorubin, lycopene, beta-apo-8'-carotenal, beta-apo-8'-carotenic acid ethyl ester, xantophylls (flavoxanthin, lutein, cryptoxanthin, rubixanthin, violaxanthin, rodoxanthin), fast carmine (carminic acid, cochineal), azorubin, cochineal red A (Ponceau 4 R), beet-root red, betanin, anthocyanins, amaranth, patent blue V, indigotine I (indigo-carmine), chlorophylls, copper compounds of chlorophylls, acid brilliant green BS (lissamine green), brilliant black BN, vegetable carbon, titanium dioxide, iron oxides and hydroxides, calcium carbonate, aluminum, silver, gold, pigment rubine BK (lithol rubine BK), methyl violet B, victoria blue R, victoria blue B, acilan brilliant blue FFR (brilliant wool blue FFR), naphthol green B, acilan fast green 10 G (alkali fast green 10 G), ceres yellow GRN, sudan blue II, ultramarine, phthalocyanine blue, phthalocayanine green, fast acid violet R. Further naturally obtained extracts (for example paprika extract, black carrot extract, red cabbage extract) can be used for coloring purposes. Goods results are also achieved with the colors named in the following, the so-called aluminum lakes: FD & C Yellow 5 Lake, FD & C Blue 2 Lake, FD & C Blue 1 Lake, Tartrazine Lake, Quinoline Yellow Lake, FD & C Yellow 6 Lake, FD & C Red 40 Lake, Sunset Yellow Lake, Carmoisine Lake, Amaranth Lake, Ponceau 4R Lake, Erythrosyne Lake, Red 2G Lake, Allura Red Lake, Patent Blue V Lake, Indigo Carmine Lake, Brilliant Blue Lake, Brown HT Lake, Black PN Lake, Green S Lake and mixtures thereof.

When the active material is a fragrance, it is preferred that fragrance ingredients within a fragrance having a ClogP of 0.5 to 15 are employed. For instance, the ingredients having a ClogP value between 0.5 to 8 (e.g., between 1 to 12, between 1.5 to 8, between 2 and 7, between 1 and 6, between 2 and 6, between 2 and 5, between 3 and 7) are 25% or greater (e.g., 50% or greater and 90% or greater) by the weight of the fragrance.

It is preferred that a fragrance having a weight-averaged ClogP of 2.5 and greater (e.g., 3 or greater, 2.5 to 7, and 2.5 to 5) is employed. The weight-averaged ClogP is calculated as follows:

$$C \log P = \{\text{Sum } [(Wi)(C \log P)i]\}/\{\text{Sum } Wi\},$$

in which Wi is the weight fraction of each fragrance ingredient and (ClogP)i is the ClogP of that fragrance ingredient.

As an illustration, it is preferred that greater than 60 wt % (preferably greater than 80 wt % and more preferably greater than 90 wt %) of the fragrance chemicals have ClogP values of greater than 2 (preferably greater than 3.3, more preferably greater than 4, and even more preferably greater than 4.5).

Those with skill in the art will appreciate that many fragrances can be created employing various solvents and fragrance chemicals. The use of a relatively low to intermediate ClogP fragrance ingredients will result in fragrances that are suitable for encapsulation. These fragrances are generally water-insoluble, to be delivered through the capsule systems of this invention onto consumer products in different stages such as damp and dry fabric. Without encapsulation, the free fragrances would normally have evaporated or dissolved in water during use, e.g., wash. Though high ClogP materials are generally well delivered from a regular (non-encapsulated) fragrance in a consumer product, they have excellent encapsulation properties and are also suitable for encapsulation for overall fragrance character purposes, very long-lasting fragrance delivery, or overcoming incompatibility with the consumer product, e.g., fragrance materials that would otherwise be instable, cause thickening or discoloration of the product or otherwise negatively affect desired consumer product properties.

In some embodiments, the amount of encapsulated active material is from 5% to 95% (e.g., 10% to 90%, 15% to 80%, and 20% to 60%) by weight of the microcapsule composition. The amount of the capsule wall is from 0.5% to 30% (e.g., 1% to 25%, 2 to 20% and 5 to 15%) also by weight of the microcapsule composition. In other embodiments, the amount of the encapsulated active material is from 15% to 99.5% (e.g., 20% to 98% and 30% to 90%) by weight of the microcapsule, and the amount of the capsule wall is from 0.5% to 85% (e.g., 2% to 50% and 5% to 40%) by weight of the microcapsule.

Adjunct Materials

In addition to the active materials, the present invention also contemplates the incorporation of adjunct materials including solvent, emollients, and core modifier materials in the core encapsulated by the capsule wall. Other adjunct materials are solubility modifiers, density modifiers, stabilizers, viscosity modifiers, pH modifiers, or any combination thereof. These modifiers can be present in the wall or core of the capsules, or outside the capsules in delivery system. Preferably, they are in the core as a core modifier.

The one or more adjunct material may be added in the amount of 0.01% to 40% (e.g., 0.5% to 30%) by weight of the microcapsule.

Suitable examples include those described in WO 2016/049456, pages 55-57 and US 2016/0158121, pages 15-18.

Deposition Aids

An exemplary deposition aid useful in the microcapsule composition of this invention is a copolymer of acrylamide and acrylamidopropyltrimonium chloride. This copolymer facilitates the deposition of the microcapsule onto a hard surface (e.g., hair, skin, fiber, furniture, and floor). The copolymer generally has an average molecular weight (e.g., weight average molecular mass (Mw) determined by size exclusion chromatography) of 2,000 Daltons to 10,000,000 Daltons with a lower limit of 2,000, 5,000, 10,000, 20,000, 50,000, 100,000, 250,000, 500,000, or 800,000 Daltons and an upper limit of 10,000,000, 5,000,000, 2,000,000, 1,000,000, or 500,000 Daltons (e.g., 500,000 to 2,000,000 and 800,000 to 1,500,000 Daltons). The charge density of the copolymer ranges from 1 meq/g to 2.5 meq/g, preferably from 1.5 to 2.2 meq/g. The copolymer of acrylamide and acrylamidopropyltrimonium chloride is commercially available from various vendors such as Ashland under the trademarks of N-Hance® SP-100 and Ciba SALCARE® SC60.

Other suitable deposition aids include anionically, cationically, nonionically, or amphoteric water-soluble polymers. Suitable deposition aids include polyquaternium-4, polyquaternium-5, polyquaternium-6, polyquaternium-7, polyquaternium-10, polyquaternium-16, polyquaternium-22, polyquaternium-24, polyquaternium-28, polyquaternium-39, polyquaternium-44, polyquaternium-46, polyquaternium-47, polyquaternium-53, polyquaternium-55, polyquaternium-67, polyquaternium-68, polyquaternium-69, polyquaternium-73, polyquaternium-74, polyquaternium-77, polyquaternium-78, polyquaternium-79, polyquaternium-80, polyquaternium-81, polyquaternium-82, polyquaternium-86, polyquaternium-88, polyquaternium-101, polyvinylamine, polyethyleneimine, polyvinylamine and vinylformamide copolymer, a methacrylamidopropyltrimonium chloride/acrylamide copolymer, and combinations thereof. More examples of the deposition aid are described in WO 2016049456, pages 13-27; and US 2014/0017278.

Additional depositional aids are those cationic polymers described in WO2016032993. These cationic polymers are typically characterized by a relatively high charge density (e.g., from 4 meq/g, or from 5 meq/g, or from 5.2 meq/g to 12 meq/g, or to 10 meq/g, or to 8 meq/g or to 7 meq/g, or to 6.5 meq/g. The cationic polymers are comprised of structural units that are nonionic, cationic, anionic, or mixtures thereof. In some aspects, the cationic polymer comprises from 5 mol % to 60 mol %, or from 15 mol % to 30 mol %, of a nonionic structural unit derived from a monomer selected from the group consisting of (meth)acrylamide, vinyl formamide, N,N-dialkyl acrylamide, N,N-dialkylmethacrylamide, $C_1$-$C_{12}$ alkyl acrylate, $C_1$-$C_{12}$ hydroxyalkyl acrylate, polyalkylene glyol acrylate, $C_1$-$C_{12}$ alkyl methacrylate, $C_1$-$C_{12}$ hydroxyalkyl methacrylate, polyalkylene glycol methacrylate, vinyl acetate, vinyl alcohol, vinyl formamide, vinyl acetamide, vinyl alkyl ether, vinyl pyridine, vinyl pyrrolidone, vinyl imidazole, vinyl caprolactam, and mixtures thereof.

In some aspects, the cationic polymer comprises a cationic structural unit at the level of 30 mol % to 100 mol %, or 50 mol % to 100 mol %, or 55 mol % to 95 mol %, or 70 mol % to 85 mol % by mass of the cationic polymer. The cationic structural unit is typically derived from a cationic monomer such as N,N-dialkylaminoalkyl methacrylate, N,N-dialkylaminoalkyl acrylate, N,N-dialkylaminoalkyl acrylamide, N,N-dialkylaminoalkylmethacrylamide, methacylamidoalkyl trialkylammonium salts, acrylamidoalkylltrialkylamminium salts, vinylamine, vinylimine, vinyl imidazole, quaternized vinyl imidazole, diallyl dialkyl ammonium salts, and mixtures thereof. Preferably, the cationic monomer is selected from the group consisting of diallyl dimethyl ammonium salts (DADMAS), N,N-dimethyl aminoethyl acrylate, N,N-dimethyl aminoethyl methacrylate (DMAM), [2-(methacryloylamino)ethyl]tri-methylammonium salts, N,N-dimethylaminopropyl acrylamide (DMAPA), N,N-dimethylaminopropyl methacrylamide (DMAPMA), acrylamidopropyl trimethyl ammonium salts (APTAS), methacrylamidopropyl trimethylammonium salts (MAPTAS), quaternized vinylimidazole (QVi), and mixtures thereof.

In some aspects, the cationic polymer comprises an anionic structural unit at a level of 0.01 mol % to 15 mol %, 0.05 mol % to 10 mol %, 0.1 mol % to 5 mol %, or 1% to 4% of by mass of the cationic polymer. In some aspects, the anionic structural unit is derived from an anionic monomer selected from the group consisting of acrylic acid (AA), methacrylic acid, maleic acid, vinyl sulfonic acid, styrene sulfonic acid, acrylamidopropylmethane sulfonic acid (AMPS) and their salts, and mixtures thereof.

Exemplary cationic polymers include polyacrylamide-co-DADMAS, polyacrylamide-co-DADMAS-co-acrylic acid, polyacrylamide-co-APTAS, polyacrylamide-co-MAPTAS, polyacrylamide-co-QVi, polyvinyl formamide-co- DADMAS, poly(DADMAS), polyacrylamide-co-MAP-TAS-coacrylic acid, polyacrylamide-co-APTAS-co-acrylic acid, and mixtures thereof.

The deposition aid is generally present at a level of 0.01% to 50% (with a lower limit of 0.01%, 0.05%, 0.1%, 0.5%, 1%, 2%, or 5% and an upper limit of 50%, 40%, 30%, 20%, 15%, or 10%, e.g., 0.1% to 30%, 1% to 20%, 2% to 15%, and 5% to 10%) by weight of the microcapsule composition. In a consumer product such as a shampoo, the deposition aid is generally present at a level of 0.001% to 20% (with a lower limit of 0.001%, 0.005%, 0.01%, 0.02%, or 0.05% and an upper limit of 20%, 15%, 10%, 5%, 2%, or 1%, e.g., 0.005% to 10%, 0.01% to 5%, and 0.02% to 0.5%) by weight of the shampoo composition. The capsule deposition aid can be added during the preparation of the microcapsules or it can be added after the microcapsules have been made.

A second capsule deposition aid from 0.01% to 25%, more preferably from 5% to 20% can be added to the microcapsule composition. The second capsule formation deposition aid can be selected from the above-described deposition aid.

Additional Components

The microcapsule composition of this invention can include one or more non-confined or unencapsulated active materials from 0.01 to 50%, more preferably from 5 to 40%.

The capsule delivery system can also contain one or more other delivery system such as polymer-assisted delivery compositions (see U.S. Pat. No. 8,187,580), fiber-assisted delivery compositions (US 2010/0305021), cyclodextrin host guest complexes (U.S. Pat. No. 6,287,603 and US 2002/0019369), pro-fragrances (WO 2000/072816 and EP 0 922 084), and any combination thereof. More exemplary delivery systems that can be incorporated are coacervate capsules, cyclodextrin delivery systems, and pro-perfumes.

Examples of additional components include those described in US 2016/0158121.

Any compound, polymer, or agent discussed above can be the compound, polymer, or agent itself as shown above, or its salt, precursor, hydrate, or solvate. A salt can be formed between an anion and a positively charged group on the compound, polymer, or agent. Suitable anions include chloride, bromide, iodide, sulfate, nitrate, phosphate, citrate, methanesulfonate, trifluoroacetate, acetate, malate, tosylate, tartrate, fumurate, glutamate, glucuronate, lactate, glutarate, and maleate. Likewise, a salt can also be formed between a cation and a negatively charged group on the compound, polymer, or agent. Suitable cations include sodium ion, potassium ion, magnesium ion, calcium ion, and an ammonium cation (e.g., tetramethylammonium ion). A precursor can be ester and another suitable derivative, which, during the process of preparing a polyurea or polyurethane capsule composition of this invention, is capable of converting to the compound, polymer, or agent and being used in preparing the polyurea or polyurethane capsule composition. A hydrate refers to the compound, polymer, or agent that contains water. A solvate refers to a complex formed between the compound, polymer, or agent and a suitable solvent. A suitable solvent can be water, ethanol, isopropanol, ethyl acetate, acetic acid, and ethanolamine.

Certain compounds, polymers, and agents have one or more stereocenters, each of which can be in the R configuration, the S configuration, or a mixture. Further, some compounds, polymers, and agents possess one or more double bonds wherein each double bond exists in the E (trans) or Z (cis) configuration, or combinations thereof. The compounds, polymers, and agents include all possible configurational stereoisomeric, regioisomeric, diastereomeric, enantiomeric, and epimeric forms as well as any mixtures thereof. As such, lysine used herein includes L-lysine, D-lysine, L-lysine monohydrochloride, D-lysine monohydrochloride, lysine carbonate, and so on. Similarly, arginine includes L-arginine, D-arginine, L-arginine monohydrochloride, D-arginine monohydrochloride, arginine carbonate, arginine monohydrate, and etc. Guanidine includes guanidine hydrochloride, guanidine carbonate, guanidine thiocyanate, and other guanidine salts including their hydrates. Ornithine includes L-ornithine and its salts/hydrates (e.g., monohydrochloride) and D-ornithine and its salts/hydrates (e.g., monohydrochloride).

The microcapsule composition of this invention can be a slurry containing in a solvent (e.g., water) the capsule at a level 0.1 to 80% (preferably 1 to 65% and more preferably 5 to 45%) by weight of the capsule delivery system. An exemplary microcapsule composition of this invention contains a plurality of microcapsules each dispersed in an aqueous phase and is stable for at least 7 days (e.g., at least 10 days, at least 30 days, and at least 60 days) at the temperature of 40° C. Stability is measured (e.g., in a graduated cylinder) by the separation of a clear aqueous phase from the microcapsule composition. The microcapsule composition is deemed stable if, by volume of the microcapsule composition, less than 10% of a clear aqueous phase is separated. The microcapsule composition is considered stable when (i) the composition has a viscosity of 3000 cP or less (e.g., 2000 cP or less) and (ii) 20% or less (e.g., 15% or less, and 10% or less) water by volume of the composition is separated from the composition. The volume of the separated water can be readily measured by a convention method, e.g., a graduated cylinder.

Microcapsule compositions are known to have the tendency to form into gels, unsuitable for use in many consumer products. The viscosity of the gelled-out composition increases to at least 3000 centipoise (cP) (e.g., at least 6000 cP). The viscosity can be readily measured on rheometer, for example a RheoStress™ 1 instrument (Commercially available from ThermoScientific), using rotating disks at a shear rate of 21 s$^{-1}$ and a temperature of 25° C.

In some embodiments, the microcapsule composition is purified by washing the capsule slurry with water until a neutral pH (pH of 6 to 8) is achieved. For the purposes of the present invention, the capsule suspension can be washed using any conventional method including the use of a separatory funnel, filter paper, centrifugation and the like. The capsule suspension can be washed one, two, three, four, five, six, or more times until a neutral pH, e.g., pH 6-8 and 6.5-7.5, is achieved. The pH of the purified capsules can be determined using any conventional method including, but not limited to pH paper, pH indicators, or a pH meter.

A capsule composition is "purified" in that it is 80%, 90%, 95%, 97%, 98% or 99% homogeneous to capsules. In accordance with the present invention, purity is achieved by washing the capsules until a neutral pH is achieved, which is indicative of removal of unwanted impurities and/or starting materials, e.g., polyisocyanate, cross-linking agent and the like.

In certain embodiments of this invention, the purification of the capsules includes the additional step of adding a salt to the capsule suspension prior to the step of washing the capsule suspension with water. Exemplary salts of use in this step of the invention include, but are not limited to, sodium chloride, potassium chloride or bi-sulphite salts. See US 2014/0017287.

The microcapsule composition of this invention can also dried, e.g., spray dried, heat dried, and belt dried, to a solid form. In a spray drying process, a spray dry carrier is added to a microcapsule composition to assist the removal of water from the slurry. See US20120151790, US20140377446, US20150267964, US20150284189, and US20160097591.

According to one embodiment, the spray dry carriers can be selected from the group consisting of carbohydrates such as chemically modified starches and/or hydrolyzed starches, gums such as gum arabic, proteins such as whey protein, cellulose derivatives, clays, synthetic water-soluble polymers and/or copolymers such as polyvinyl pyrrolidone, polyvinyl alcohol. The spray dry carriers may be present in an amount from 1% to 50%, more preferably from 5% to 20%, by weight of the microcapsule composition in slurry.

Optionally, a free flow agent (anticaking agent) of silicas which may be hydrophobic (i.e. silanol surface treated with halogen silanes, alkoxysilanes, silazanes, siloxanes, etc. such as commercial products available under the trademarks of Sipernat® D17, Aerosil® R972 and R974 from Degussa, Piscataway, New Jersey) and/or hydrophilic available under the trademarks of Aerosil® 200, Sipernat® 22S, Sipernat® 50S (available from Degussa), Syloid® 244 (available from Grace Davison), may be present from 0.01% to 10%, more preferable from 0.5% to 5%, by weight of the microcapsule composition in slurry.

Humectants and viscosity control/suspending agents can also be added to facilitate spray drying. These agents are disclosed in U.S. Pat. Nos. 4,446,032 and 6,930,078. Details of hydrophobic silica as a functional delivery vehicle of active materials other than a free flow/anticaking agent are disclosed in U.S. Pat. Nos. 5,500,223 and 6,608,017.

The spray drying inlet temperature is in the range of 150° C. to 240° C., preferably between 170° C. and 230° C., more preferably between 190° C. and 220° C.

As described herein, the spray-dried microcapsule composition is well suited for use in a variety of all dry (anhydrous) products: powder laundry detergent, fabric softener dryer sheets, household cleaning dry wipes, powder dish detergent, floor cleaning cloths, or any dry form of personal care products (e.g. shampoo powder, deodorant powder, foot powder, soap powder, baby powder), etc. Because of high fragrance and/or active agent concentration in the spray-dried products of the present invention, characteristics of the aforementioned consumer dry products will not be adversely affected by a small dosage of the spray-dried products.

The microcapsule composition can also be sprayed as a slurry onto a consumer product, e.g., a fabric care product. By way of illustration, a liquid delivery system containing capsules is sprayed onto a detergent powder during blending to make granules. See US 2011/0190191. In order to increase fragrance load, water-absorbing material, such as zeolite, can be added to the delivery system.

Alternatively, granulates in a consumer product are prepared in a mechanical granulator in the presence of a granulation auxiliary such as non-acid water-soluble organic crystalline solids. See WO 2005/097962.

Zeta Potentials and Rupture Forces

The microcapsule of this invention is positively charged as indicated by a zeta potential of at least 10 mV, preferably at least 25 mV (e.g., 25 mV to 200 mV), and more preferably at least 40 mV (e.g., 40 mV to 100 mV).

Zeta potential is a measurement of electrokinetic potential in the microcapsule. From a theoretical viewpoint, zeta potential is the potential difference between the water phase (i.e., the dispersion medium) and the stationary layer of water attached to the surface of the microcapsule.

The zeta potential is an important indicator of the stability of the microcapsule in compositions or consumer products. Typically, a microcapsule having a zeta potential of 10 mV to 25 mV shows a moderate stability. Similarly, a microcapsule having a zeta potential of 25 mV to 40 mV shows a good stability and a microcapsule having a zeta potential of 40 mV to 100 mV shows excellent stability. Not to be bound by any theory, the microcapsule of this invention has a desirable zeta potential making it suitable for use in consumer products with improved stability.

The zeta potential can be calculated using theoretical models and an experimentally-determined electrophoretic mobility or dynamic electrophoretic mobility. The zeta potential is conventionally measured by methods such as microelectrophoresis, or electrophoretic light scattering, or electroacoustic phenomena. For more detailed discussion on measurement of zeta potential, see Dukhin and Goetz, "Ultrasound for characterizing colloids", Elsevier, 2002.

The microcapsule of this invention has a fracture strength of 0.2 MPa to 80 MPa (e.g., 0.5 MPa to 60 MPa, 1 MPa to 50 MPa, and 5 MPa to 30 MPa). The fracture strength of each microcapsule is calculated by dividing the rupture force (in Newtons) by the cross-sectional area of the respective microcapsule ($\pi r^2$, where r is the radius of the particle before compression). The measurement of the rupture force and the cross-sectional area is performed following the methods described in Zhang et al., *J. Microencapsulation* 18(5), 593-602 (2001).

The microcapsule of this invention has a rupture force of less than 10 millinewtons ("mN") such as 0.1 mN to 10 mN, 0.2 mN to 8 mN, 0.3 mN to 5 mN, 0.1 mN to 2 mN, 0.1 mN, 0.5 mN, 1 mN, 2 mN, 5 mN, and 8 mN. The rupture force is the force needed to rupture the microcapsules. Its measurement is based on a technique known in the art as micro-manipulation. See Zhang et al., *Journal of Microencapsulation* 16(1), 117-124 (1999).

Hair Care Products

The microcapsule of this invention is suitable for use in hair care products including shampoo compositions and hair conditioning products.

Shampoo compositions typically contain detersive compositions, carriers, microcapsules, and deposition aids. The detersive composition can be all aqueous phase or may comprise both an oil phase and an aqueous phase and may comprise any combination of the following components: a detersive surfactant, anti-dandruff agent, and aqueous carrier. The detersive surfactant provides cleaning performance to the composition. The detersive surfactant in turn comprises anionic detersive surfactant, zwitterionic or amphoteric detersive surfactant, or combinations thereof. Various examples and descriptions of detersive surfactants are set forth in U.S. Patent Publication 20160228338, which is incorporated herein by reference in its entirety.

The concentration of the anionic surfactant component in the shampoo should be sufficient to provide the desired cleaning and lather performance, and generally ranges from 2% to 50% (e.g., 8% to 30%, 10% to 25%, and 12% to 22%) by weight of the shampoo composition.

Anionic surfactants suitable for use in the compositions are the alkyl and alkyl ether sulfates. Other suitable anionic detersive surfactants are the water-soluble salts of organic, sulfuric acid reaction products. Still other suitable anionic detersive surfactants are the reaction products of fatty acids esterified with isethionic acid and neutralized with sodium hydroxide. Examples include ammonium lauryl sulfate, ammonium laureth sulfate, triethylamine lauryl sulfate, triethylamine laureth sulfate, triethanolamine lauryl sulfate, triethanolamine laureth sulfate, monoethanolamine lauryl sulfate, monoethanolamine laureth sulfate, diethanolamine lauryl sulfate, diethanolamine laureth sulfate, lauric monoglyceride sodium sulfate, sodium lauryl sulfate, sodium laureth sulfate, potassium lauryl sulfate, potassium laureth sulfate, sodium lauryl sarcosinate, sodium lauroyl sarcosinate, lauryl sarcosine, cocoyl sarcosine, ammonium cocoyl sulfate, ammonium lauroyl sulfate, sodium cocoyl sulfate, sodium lauroyl sulfate, potassium cocoyl sulfate, potassium lauryl sulfate, triethanolamine lauryl sulfate, triethanolamine lauryl sulfate, monoethanolamine cocoyl sulfate, monoethanolamine lauryl sulfate, sodium tridecyl benzene sulfonate, sodium dodecyl benzene sulfonate, sodium cocoyl isethionate and combinations thereof. In a further embodiment of the present invention, the anionic surfactant is sodium lauryl sulfate or sodium laureth sulfate.

Suitable amphoteric or zwitterionic detersive surfactants include those which are known for use in hair care or other personal care cleansing. Concentrations of such amphoteric detersive surfactants range from 0.5% to 20% (e.g., 1% to 10%). Non limiting examples of suitable zwitterionic or amphoteric surfactants are described in U.S. Pat. No. 5,104,646 (Bolich Jr. et al.), U.S. Pat. No. 5,106,609 (Bolich Jr. et al.). Examples of amphoteric detersive surfactants include cocoamphoacetate, cocoamphodiacetate, lauroamphoacetate, lauroamphodiacetate, and mixtures thereof. Zwitterionic detersive surfactants suitable for use in the composition include those surfactants broadly described as derivatives of aliphatic quaternaryammonium, phosphonium, and sulfonium compounds, in which the aliphatic radicals can be straight- or branched chain, and wherein one of the aliphatic substituents contains from about 8 to about 18 carbon atoms and one contains an anionic group such as carboxy, sulfonate, sulfate, phosphate or phosphonate. In another embodiment, zwitterionics such as betaines are selected. Non limiting examples of other anionic, zwitterionic, amphoteric or optional additional surfactants suitable for use in the compositions are described in McCutcheon's, Emulsifiers and Detergents, 1989 Annual, published by M. C. Publishing Co., and U.S. Pat. No. 3,929,678.

The detersive composition may also contain an anti-dandruff agent. Examples include antimicrobial actives, pyridinethione salts, azoles, selenium sulfide, particulate sulfur, keratolytic acid, salicylic acid, octopirox (piroctone olamine), coal tar, and combinations thereof. In one aspect, the anti-dandruff agents typically are pyridinethione salts. Such anti-dandruff agents should be physically and chemically compatible with the essential components of the composition, and should not otherwise unduly impair-product stability, aesthetics or performance.

The shampoo composition can be in the form of pourable liquids (under ambient conditions). Such compositions will therefore typically comprise an aqueous carrier, which is present at a level of from 20% to 95% (e.g., 60% to 85%). The aqueous carrier may comprise water, or a miscible mixture of water and organic solvent, and in one aspect may comprise water with minimal or no significant concentrations of organic solvent, except as otherwise incidentally incorporated into the composition as minor ingredients of other essential or optional components. The carrier useful in the present invention includes water and water solutions of lower alkyl alcohols and polyhydric alcohols. The lower alkyl alcohols useful herein are monohydric alcohols having 1 to 6 carbons, in one aspect, ethanol and isopropanol. The polyhydric alcohols useful herein include propylene glycol, hexylene glycol, glycerin, and propane diol.

The shampoo composition may further comprise other optional ingredients that are known for use or otherwise useful in compositions. Such optional ingredients are most typically those described in reference books such as the CTFA Cosmetic Ingredient Handbook, Second Edition, The Cosmetic, Toiletries, and Fragrance Association, Inc. 1988, 1992. Non-limiting examples of such optional ingredients include perfumes or fragrances, coloring agents or dyes, hair bleaching agents, thickeners, moisturizers, emollients, pharmaceutical actives, vitamins or nutrients, anti-dandruff agents, perfumes, hair colorants, hair perming agents, hair growth or restorer agents, and similar other materials.

The shampoo compositions can be in the form of rinse-off products or leave-on products, and can be formulated in a wide variety of product forms, including but not limited to creams, gels, emulsions, mousses and sprays.

In one embodiment, the shampoo composition is in the form of a gel comprising less than 45% water. In such embodiment, the gel may have a neat viscosity of 1,000 cP to 10,000 cP. The neat viscosity of a gel can be defined as the viscosity of the fluid at a shear rate of 1/sec. Scientifically, viscosity is the ratio of shear stress to shear rate. In some embodiments, the range of shear rates for gels is from 0.01/see to 10/sec. The viscosity can be readily measured on rheometer, for example an instrument commercially available from ThermoScientific under the trademark of HAKE™ RheoStress™ 1. The viscosity is typically obtained using rotating disks at a shear rate of 1/see and a temperature of 25° C.

Hair conditioner products includes hair conditioners, leave-on hair conditioners, leave-in conditioners, rejuvenating conditioners, creme rinses, oil-free hair conditioners, rinse-off hair conditioners, conditioning rinses, foaming conditioners, conditioning styling gels, conditioning mousses, spay-on conditioners, hair dressing cremes and hair repair sprays.

The term "leave-on" refers to a personal care composition that is applied to the body including hair and skin, and not further subjected to a rinsing step. The term "rinse-out" as contrasted with the term "leave on" is used herein to mean compositions which are used in a context whereby the composition is ultimately rinsed or washed from the body such as skin and hair either after or during the application of the product.

Conditioning agents include any material used to give a particular conditioning benefit to hair. Suitable conditioning agents are those which deliver one or more benefits relating to shine, softness, comb ability, antistatic properties, wet-handling, damage, manageability, body, and greasiness. Examples include silicones (e.g. silicone oils, cationic silicones, silicone gums, high refractive silicones, silicone quaternary compounds, and silicone resins), organic conditioning oils (e.g., hydrocarbon oils, polyolefins, fatty acids, fatty alcohols, and fatty esters), alkyl quaternaries, and combinations thereof. See U.S. Pat. No. 6,696,053 and WO 2017/127494.

The concentration of the conditioning agent in the hair conditioner products should be sufficient to provide the desired conditioning benefits, and as will be apparent to one of ordinary skill in the art (e.g., 0.1% to 30%, 0.1% to 20%, 0.1% to 10%, and 0.1% to 6%).

The microcapsule composition can be present at a level of 0.02% to 15% (e.g., 0.05% to 10%, 0.1% to 5%, and 0.5% to 3%) by weight of the hair conditioning composition, or in term of the fragrance load, at a level of 0.01% to 5% (e.g., 0.02% to 3%, 0.05% to 2%, and 0.1% to 1%). The term "fragrance load" refers to the percentage of the fragrance by weight of the consumer product.

The hair care products can contain any one of the microcapsule described above and a conditioning agent. Optional additional components that can be included in the hair care products are cationic thickeners, carriers, emollients, moisturizing agents, hair soothing agents, anti-oxidants/radical scavengers, chelators or chelating agents, anti-inflammatory agents antimicrobial actives, sunscreen actives, antidandruff agents, styling agents, hair bodying and volumizing agents, and combinations thereof. See U.S. Pat. No. 6,696,053 and WO 2017/127494.

Fabric Conditioning Products

The microcapsule composition of this invention is also suitable for use in fabric care products such as fabric conditioning products.

The fabric conditioning compositions having the microcapsule composition contains at least one fabric conditioning agent, preferably at a concentration of 1% to 30% (e.g., 4% to 20%, 4% to 10%, and 8% to 15%). It would be obvious to a skilled person in the art to determine the concentration of a fabric conditioning agent while keeping its conditioning benefits and also maintaining a reasonable stability and shelf life.

Suitable fabric conditioning agents include cationic surfactants. Non-limiting examples are quaternary ammonium compounds such as alkylated quaternary ammonium compounds, ring or cyclic quaternary ammonium compounds, aromatic quaternary ammonium compounds, diquaternary ammonium compounds, alkoxylated quaternary ammonium compounds, amidoamine quaternary ammonium compounds, ester quaternary ammonium compounds, and mixtures thereof. Fabric softening compositions, and components thereof, are generally described in US 2004/0204337 and US 2003/0060390. Suitable softening agents include esterquats such as the product sold under the trademark of Rewoquat® WE 18 from Evonik Industries and the product sold under the trademark of Stepantex® SP-90 from Stepan Company.

The microcapsule composition can be present at a level of 0.02% to 15% (e.g., 0.05% to 10%, 0.1% to 5%, and 0.5% to 3%) so that the fabric conditioning composition has a fragrance load of 0.01% to 5% (e.g., 0.02% to 3%, 0.05% to 2%, and 0.1% to 1%).

Applications.

The microcapsule of the present invention is well-suited for use, without limitation, in the following additional products:

a) Household products i. Liquid or Powder Laundry Detergents which can use the present invention include those systems described in U.S. Pat. Nos. 5,929,022, 5,916,862, 5,731,278, 5,565,145, 5,470,507, 5,466,802, 5,460,752, 5,458,810, 5,458,809, 5,288,431, 5,194,639, 4,968,451, 4,597,898, 4,561,998, 4,550,862, 4,537,707, 4,537,706, 4,515,705, 4,446,042, and 4,318,818 ii. Unit Dose Pouches, Tablets and Capsules such as those described in EP 1 431 382 A1, US 2013/0219996 A1, US 2013/0284637 A1, and U.S. Pat. No. 6,492,315. These unit dose formulations can contain high concentrations of a functional material (e.g., 5-100% fabric softening agent or detergent active), fragrance (e.g., 0.5-100%, 0.5-40%, and 0.5-15%), and flavor (e.g., 0.1-100%, 0.1-40%, and 1-20%). They can contain no water to limit the water content as low as less than 30% (e.g., less than 20%, less than 10%, and less than 5%).

iii. Scent Boosters such as those described in U.S. Pat. Nos. 7,867,968, 7,871,976, 8,333,289, US 2007/0269651 A1, and US2014/0107010 A1.

iv. Fabric Care Products such as Rinse Conditioners (containing 1-30 weight % of a fabric conditioning active), Fabric Liquid Conditioners (containing 1 to 30 weight % of a fabric conditioning active), Tumble Drier Sheets, Fabric Refreshers, Fabric Refresher Sprays, Ironing Liquids, and Fabric Softener Systems such as those described in U.S. Pat. Nos. 6,335,315, 5,674,832, 5,759,990, 5,877,145, 5,574,179, 5,562,849, 5,545,350, 5,545,340, 5,411,671, 5,403,499, 5,288,417, and 4,767,547 Liquid fabric softeners/fresheners contain at least one fabric softening agent present, preferably at a concentration of 1 to 30% (e.g., 4 to 20%, 4 to 10%, and 8 to 15%). The ratio between the active material and the fabric softening agent can be 1:500 to 1:2 (e.g., 1:250 to 1:4 and 1:100 to 1:8). As an illustration, when the fabric softening agent is 5% by weight of the fabric softener, the active material is 0.01% to 2.5%, preferably 0.02% to 1.25% and more preferably 0.1% to 0.63%. As another example, when the fabric softening agent is 20% by weight of the fabric softener, the active material is 0.04% to 10%, preferably 0.08% to 5% and more preferably 0.4% to 2.5%. The active material is a fragrance, malodor counteractant or mixture thereof. The liquid fabric softener can have 0.15% to 15% of capsules (e.g., 0.5% to 10%, 0.7% to 5%, and 1% to 3%). When including capsules at these levels, the neat oil equivalent (NOE) in the softener is 0.05% to 5% (e.g., 0.15% to 3.2%, 0.25% to 2%, and 0.3% to 1%).

Suitable fabric softening agents include cationic surfactants. Non-limiting examples are quaternary ammonium compounds such as alkylated quaternary ammonium compounds, ring or cyclic quaternary ammonium compounds, aromatic quaternary ammonium compounds, diquaternary ammonium compounds, alkoxylated quaternary ammonium compounds, amidoamine quaternary ammonium compounds, ester quaternary ammonium compounds, and mixtures thereof. Fabric softening compositions, and components thereof, are generally described in US 2004/0204337 and US 2003/0060390. Suitable softening agents include esterquats such as Rewoquat WE 18 commercially available from Evonik Industries and Stepantex SP-90 commercially available from Stepan Company.

v. Liquid dish detergents such as those described in U.S. Pat. Nos. 6,069,122 and 5,990,065 vi. Automatic Dish Detergents such as those described in U.S. Pat. Nos. 6,020,294, 6,017,871, 5,968,881, 5,962,386, 5,939,373, 5,914,307, 5,902,781, 5,705,464, 5,703,034, 5,703,030, 5,679,630, 5,597,936, 5,581,005, 5,169,552, and 4,714,562 vii. All-purpose Cleaners including bucket dilutable cleaners and toilet cleaners viii. Bathroom Cleaners ix. Bath Tissue x. Rug Deodorizers xi. Candles xii. Room Deodorizers xiii. Floor Cleaners xiv. Disinfectants xv. Window Cleaners xvi. Garbage bags/trash can liners
xvii. Air Fresheners including room deodorizer and car deodorizer, scented candles, sprays, scented oil air freshener, Automatic spray air freshener, and neutralizing gel beads
xviii. Moisture absorber
xix. Household Devices such as paper towels and disposable Wipes
xx. Moth balls/traps/cakes b) Baby Care Products
  i. Diaper Rash Cream/Balm
  ii. Baby Powder c) Baby Care Devices
  i. Diapers
  ii. Bibs
  iii. Wipes d) Oral Care Products. Tooth care products (as an example of preparations according to the invention used for oral care) generally include an abrasive system (abrasive or polishing agent), for example silicic acids, calcium carbonates, calcium phosphates, aluminum oxides and/or hydroxylapatites, surface-active substances, for example sodium lauryl sulfate, sodium lauryl sarcosinate and/or cocamidopropylbetaine, humectants, for example glycerol and/or sorbitol, thickening agents, for example carboxymethyl cellulose, polyethylene glycols, carrageenan and/or Laponite®, sweeteners, for example saccharin, taste correctors for unpleasant taste sensations, taste correctors for further, normally not unpleasant taste sensations, taste-modulating substances (for example inositol phosphate, nucleotides such as guanosine monophosphate, adenosine monophosphate or other substances such as sodium glutamate or 2-phenoxypropionic acid), cooling active ingredients, for example menthol derivatives, (for example L-menthyllactate, L-menthylalkylcarbonates, menthone ketals, menthane carboxylic acid amides), 2,2,2-trialkylacetic acid amides (for example 2,2-diisopropylpropionic acid methyl amide), icilin and icilin derivatives, stabilizers and active ingredients, for example sodium fluoride, sodium monofluorophosphate, tin difluoride, quaternary ammonium fluorides, zinc citrate, zinc sulfate, tin pyrophosphate, tin dichloride, mixtures of various pyrophosphates, triclosan, cetylpyridinium chloride, aluminum lactate, potassium citrate, potassium nitrate, potassium chloride, strontium chloride, hydrogen peroxide, flavorings and/or sodium bicarbonate or taste correctors.
  i. Tooth Paste. An exemplary formulation as follows:
    1. calcium phosphate 40-55%
    2. carboxymethyl cellulose 0.8-1.2%
    3. sodium lauryl sulfate 1.5-2.5%
    4. glycerol 20-30%
    5. saccharin 0.1-0.3%
    6. flavor oil 1-2.5%
    7. water q.s. to 100%
      A typical procedure for preparing the formulation includes the steps of (i) mixing by a blender according to the foregoing formulation to provide a toothpaste, and (ii) adding a composition of this invention and blending the resultant mixture till homogeneous.
  ii. Tooth Powder
  iii. Oral Rinse
  iv. Tooth Whiteners
  v. Denture Adhesive e) Health Care Devices
  i. Dental Floss
  ii. Toothbrushes
  iii. Respirators
  iv. Scented/flavored condoms f) Feminine Hygiene Products such as Tampons, Feminine Napkins and Wipes, and Pantiliners g) Personal Care Products: Cosmetic or pharmaceutical preparations, e.g., a "water-in-oil" (W/O) type emulsion, an "oil-in-water" (O/W) type emulsion or as multiple emulsions, for example of the water-in-oil-in-water (W/O/W) type, as a PIT emulsion, a Pickering emulsion, a micro-emulsion or nano-emulsion; and emulsions which are particularly preferred are of the "oil-in-water" (O/W) type or water-in-oil-in-water (W/O/W) type. More specifically,
  i. Personal Cleansers (bar soaps, body washes, and shower gels)
  ii. In-shower conditioner
  iii. Sunscreen ant tattoo color protection (sprays, lotions, and sticks)
  iv. Insect repellants
  v. Hand Sanitizer
  vi. Antiinflammatory balms, ointments, and sprays
  vii. Antibacterial ointments and creams
  viii. Sensates
  ix. Deodorants and Antiperspirants including aerosol and pump spray antiperspirant, stick antiperspirant, roll-on antiperspirant, emulsion spray antiperspirant, clear emulsion stick antiperspirant, soft solid antiperspirant, emulsion roll-on antiperspirant, clear emulsion stick antiperspirant, opaque emulsion stick antiperspirant, clear gel antiperspirant, clear stick deodorant, gel deodorant, spray deodorant, roll-on, and cream deodorant
  x. Wax-based Deodorant. An exemplary formulation as follows:
    1. Parafin Wax 10-20%
    2. Hydrocarbon Wax 5-10%
    3. White Petrolatum 10-15%
    4. Acetylated Lanolin Alcohol 2-4%
    5. Diisopropyl Adipate 4-8%
    6. Mineral Oil 40-60%
    7. Preservative (as needed)
      The formulation is prepared by (i) mixing the above ingredients, (ii) heating the resultant composition to 75° C. until melted, (iii) with stirring, adding 4% cryogenically ground polymer containing a fragrance while maintaining the temperature 75° C., and (iv) stirring the resulting mixture in order to ensure a uniform suspension while a composition of this invention is added to the formulation.
  xi. Glycol/Soap Type Deodorant. An exemplary formulation as follows:
    1. Propylene Glycol 60-70%
    2. Sodium Stearate 5-10%
    3. Distilled Water 20-30%
    4. 2,4,4-Trichloro-2'-Hydroxy Diphenyl Ether, manufactured by the Ciba-Geigy Chemical Company and a Trademark of the Ciba-Geigy Chemical Company) 0.01-0.5%
      The ingredients are combined and heated to 75° C. with stirring until the sodium stearate has dissolved. The resulting mixture is cooled to 40° C. followed by addition of a composition of this invention.

- xii. Lotion including body lotion, facial lotion, and hand lotion
- xiii. Body powder and foot powder
- xiv. Toiletries
- xv. Body Spray
- xvi. Shave cream and male grooming products
- xvii. Bath Soak
- xviii. Exfoliating Scrub h) Personal Care Devices
  - i. Facial Tissues
  - ii. Cleansing wipes i) Hair Care Products
  - i. Shampoos (liquid and dry powder)
  - ii. Hair Conditioners (Rinse-out conditioners, leave-in conditioners, and cleansing conditioners)
  - iii. Hair Rinses
  - iv. Hair Refreshers
  - v. Hair perfumes
  - vi. Hair straightening products
  - vii. Hair styling products, Hair Fixative and styling aids
  - viii. Hair combing creams
  - ix. Hair wax
  - x. Hair foam, hair gel, nonaerosol pump spray
  - xi. Hair Bleaches, Dyes and Colorants
  - xii. Perming agents
  - xiii. Hair wipes j) Beauty Care
  - i. Fine Fragrance—Alcoholic. Compositions and methods for incorporating fragrance capsules into alcoholic fine fragrances are described in U.S. Pat. No. 4,428,869. Alcoholic fine fragrances may contain the following:
    1. Ethanol (1-99%)
    2. Water (0-99%)
    3. A suspending aide including but not limited to: hydroxypropyl cellulose, ethyl cellulose, silica, microcrystalline cellulose, carrageenan, propylene glycol alginate, methyl cellulose, sodium carboxymethyl cellulose or xanthan gum (0.1%)
    4. Optionally an emulsifier or an emollient may be included including but not limited to those listed above
  - ii. Solid Perfume
  - iii. Lipstick/lip balm
  - iv. Make-up cleanser
  - v. Skin care cosmetic such as foundation, pack, sunscreen, skin lotion, milky lotion, skin cream, emollients, skin whitening
  - vi. Make-up cosmetic including manicure, mascara, eyeliner, eye shadow, liquid foundation, powder foundation, lipstick and cheek rouge k) Consumer goods packaging such as fragranced cartons, fragranced plastic bottles/boxes l) Pet care products
  - i. Cat litter
  - ii. Flea and tick treatment products
  - iii. Pet grooming products
  - iv. Pet shampoos
  - v. Pet toys, treats, and chewables
  - vi. Pet training pads
  - vii. Pet carriers and crates m) Confectionaries confectionery, preferably selected from the group consisting of chocolate, chocolate bar products, other products in bar form, fruit gums, hard and soft caramels and chewing gum
  - i. Gum
    1. Gum base (natural latex chicle gum, most current chewing gum bases also presently include elastomers, such as polyvinylacetate (PVA), polyethylene, (low or medium molecular weight) polyisobutene (PIB), polybutadiene, isobutene-isoprene copolymers (butyl rubber), polyvinylethylether (PVE), polyvinylbutyether, copolymers of vinyl esters and vinyl ethers, styrene-butadiene copolymers (styrene-butadiene rubber, SBR), or vinyl elastomers, for example based on vinylacetate/vinyllaurate, vinylacetate/vinylstearate or ethylene/vinylacetate, as well as mixtures of the mentioned elastomers, as described for example in EP 0 242 325, U.S. Pat. Nos. 4,518,615, 5,093,136, 5,266,336, 5,601,858 or 6,986,709) 20-25%
    2. Powdered sugar 45-50%
    3. glucose 15-17%
    4. starch syrup 10-13%
    5. plasticizer 0.1%
    6. flavor 0.8-1.2%
       The components described above were kneaded by a kneader according to the foregoing formulation to provide a chewing gum. Encapsulated Flavor or sensate is then added and blended till homogeneous.
  - ii. Breath Fresheners
  - iii. Orally Dissolvable Strips
  - iv. Chewable Candy
  - v. Hard Candy n) Baked products, preferably selected from the group consisting of bread, dry biscuits, cakes and other cookies;

o) snack foods, preferably selected from the group consisting of baked or fried potato chips or potato dough products, bread dough products and corn or peanut-based extrudates;
  - i. Potato, tortilla, vegetable or multigrain chips
  - ii. Popcorn
  - iii. Pretzels
  - iv. Extruded stacks p) Cereal Products preferably selected from the group consisting of breakfast cereals, muesli bars and pre-cooked finished rice products q) Alcoholic and non-alcoholic beverages, preferably selected from the group consisting of coffee, tea, wine, beverages containing wine, beer, beverages containing beer, liqueurs, schnapps, brandies, sodas containing fruit, isotonic beverages, soft drinks, nectars, fruit and vegetable juices and fruit or vegetable preparations; instant beverages, preferably selected from the group consisting of instant cocoa beverages, instant tea beverages and instant coffee beverages
  - i. Ready to drink liquid drinks
  - ii. Liquid Drink Concentrates
  - iii. Powder Drinks
  - iv. Coffee: Instant Cappuccino
    1. Sugar 30-40%
    2. Milk Powder 24-35%
    3. Soluble Coffee 20-25%
    4. Lactose 1-15%
    5. Food Grade Emulsifier 1-3%
    6. Encapsulated Volatile Flavor 0.01-0.5%
  - v. Tea
  - vi. Alcoholic r) Spice blends and consumer prepared foods
  i. Powder gravy, sauce mixes
  ii. Condiments
  iii. Fermented Products
s) Ready to heat foods: ready meals and soups, preferably selected from the group consisting of powdered soups, instant soups, precooked soups
  i. Soups
  ii. Sauces
  iii. Stews
  iv. Frozen entrees
t) Dairy Products milk products, preferably selected from the group consisting of milk beverages, ice milk, yogurt, kefir, cream cheese, soft cheese, hard cheese, powdered milk, whey, butter, buttermilk and partially or fully hydrolyzed milk protein-containing products Flavored milk beverages
  i. Yoghurt
  ii. Ice cream
  iii. Bean Curd
  iv. Cheese
u) Soya protein or other soybean fractions, preferably selected from the group consisting of soya milk and products produced therefrom, soya lecithin-containing preparations, fermented products such as tofu or tempeh or products produced therefrom and soy sauces;
v) Meat products, preferably selected from the group consisting of ham, fresh or raw sausage preparations, and seasoned or marinated fresh or salt meat products
w) Eggs or egg products, preferably selected from the group consisting of dried egg, egg white and egg yolk
x) Oil-based products or emulsions thereof, preferably selected from the group consisting of mayonnaise, remoulade, dressings and seasoning preparations
y) fruit preparations, preferably selected from the group consisting of jams, sorbets, fruit sauces and fruit fillings; vegetable preparations, preferably selected from the group consisting of ketchup, sauces, dried vegetables, deep-frozen vegetables, precooked vegetables, vegetables in vinegar and preserved vegetables
z) Flavored pet foods.

The above-listed applications are all well known in the art. For example, fabric softener systems are described in U.S. Pat. Nos. 6,335,315, 5,674,832, 5,759,990, 5,877,145, 5,574,179; 5,562,849, 5,545,350, 5,545,340, 5,411,671, 5,403,499, 5,288,417, and 4,767,547, 4,424,134. Liquid laundry detergents include those systems described in U.S. Pat. Nos. 5,929,022, 5,916,862, 5,731,278, 5,565,145, 5,470,507, 5,466,802, 5,460,752, 5,458,810, 5,458,809, 5,288,431, 5,194,639, 4,968,451, 4,597,898, 4,561,998, 4,550,862, 4,537,707, 4,537,706, 4,515,705, 4,446,042, and 4,318,818. Liquid dish detergents are described in U.S. Pat. Nos. 6,069,122 and 5,990,065. Shampoo and conditioners that can employ the present invention include those described in U.S. Pat. Nos. 6,162,423, 5,968,286, 5,935,561, 5,932,203, 5,837,661, 5,776,443, 5,756,436, 5,661,118, 5,618,523, 5,275,755, 5,085,857, 4,673,568, 4,387,090 and 4,705,681. Automatic Dish Detergents are described in U.S. Pat. Nos. 6,020,294, 6,017,871, 5,968,881, 5,962,386, 5,939,373, 5,914,307, 5,902,781, 5,705,464, 5,703,034, 5,703,030, 5,679,630, 5,597,936, 5,581,005, 5,559,261, 4,515,705, 5,169,552, and 4,714,562.

All parts, percentages and proportions refer to herein and in the claims are by weight unless otherwise indicated.

The values and dimensions disclosed herein are not to be understood as being strictly limited to the exact numerical values recited. Instead, unless otherwise specified, each such value is intended to mean both the recited value and a functionally equivalent range surrounding that value. For example, a value disclosed as "50%" is intended to mean "about 50%."

The terms "include," "includes," and "including," are meant to be non-limiting.

The terms "capsule" and "microcapsule" herein are used interchangeably.

The terms "polyfunctional isocyanate," "multifunctional isocyanate," and "polyisocyanate" are used interchangeably and refer to a compound having two or more isocyanate (—NCO) groups.

The terms "polyfunctional amine," "multifunctional amine," and "polyamine" are used interchangeably and refer to a compound containing one, two, or more primary or secondary amine groups. These terms also refers to a compound containing one or more primary/secondary amine groups and one or more hydroxyl groups (—OH).

The terms "polyethyleneimine," "polyethyleneimines," "polyethylenimine," and "polyethylenimines" are used interchangeably.

The terms "polyfunctional alcohol," "multifunctional alcohol," "poly alcohol," and "polyol" are used interchangeably and refer to a compound having two or more hydroxyl groups.

The term "degree of polymerization" refers to the number of monomeric units in a polymer.

The term "degree of crosslinking" refers to percent of interconnecting units over the total repeat unit. It is generally measured by swelling experiments. See ASTM Standard Test Method ASTM D2765-11; Lange, Colloid & Polymer Science 264, 488-93 (1986).

The terms "multi-functional nucleophile" and "polyfunctional nucleophile" are used herein interchangeably. They both refer to an aliphatic or aromatic hydrocarbon onto which is attached two or more nucleophilic groups such as primary/secondary amine groups and the hydroxyl group.

The term "multi-functional electrophile" and "polyfunctional electrophile" are used interchangeably and refer to an aliphatic or aromatic hydrocarbon, onto which is attached two or more electrophilic groups reactive towards the nucleophilic group. Examples of an electrophilic group include: aldehydes, halide, sulfate esters, sulphonate esters, epoxide, chlorohydrins as well as terminal olefins conjugated with a carbonyl group including ketone, amide, or ester.

The invention is described in greater detail by the following non-limiting examples. Without further elaboration, it is believed that one skilled in the art can, based on the description herein, utilize the present invention to its fullest extent. All publications cited herein are incorporated by reference in their entirety.

EXAMPLES

Three microcapsule slurries, i.e., Microcapsule Slurries A, B and C, were prepared following the procedure described below. They were used to prepare microcapsule compositions and shampoo compositions of this invention.

Microcapule Slurry A

An oil phase was provided by mixing 192 grams ("g") of a research fragrance accord (Fragrance A, International Flavors & Fragrances, Union Beach, NJ), 48 g of NEOBEE oil M-5 (caprylic/capric triglyceride, Stepan, Chicago, IL), and 19.2 g of trimethylol propane-adduct of xylylene diisocyanate (sold under the trademark of Takenates D110—N from Mitsui Chemicals Corporation, Rye Brook, NY). In a separate beaker, an aqueous phase was prepared by mixing an aqueous solution (30 g) containing 10% of polystyrene sulfonate (sold under the trademark of FLEXAN™ II, Akzo Nobel, Bridgewater, NJ) and an aqueous solution (60 g) of 1% CMC (carboxymethyl cellulose, sold under the trademark of WALOCEL® CRT 50000 PA, Dow, Midland, MI) in 200.4 g of water. The oil phase was emulsified into the aqueous phase to form an oil-in-water fragrance emulsion under shearing (ULTRA TURRAX, T25 Basic, IKA WERKE) at 9500 rpm for three minutes. After the fragrance emulsion was heated to 25° C., 50.4 g of a 30% branched polyethylenimine aqueous solution (commercially available under the trademark of Lupasol® WF from BASF, Florham Park, NJ) was added under constant agitation. The resultant capsule slurry was cured at 55° C. for two hours to obtain Microcapsule Slurry A containing unmodified polyurea microcapsule A together with free branched polyethyleneimine that is not reacted with the polyisocyanate and is not part of the encapsulating polymer.

Microcapsule Slurry B

Microcapsule Slurry B was prepared by washing Microcapsule Slurry A three time with water to remove the free branched polyethyleneimine.

Microcapsule Slurry C

An oil phase was provided by mixing 186 g of Research Fragrance A (International Flavors & Fragrances) and 46.5 g of NEOBEE oil (Stepan). In a separate beaker, an aqueous phase was prepared by dissolving 4.5 g of 30% cetyltrimethylammonium chloride solution ("CTAC," AIC, Framinghan, MA) in 130.5 g of water. The oil phase was emulsified into the aqueous phase to form an oil-in-water fragrance emulsion under high at 9500 rpm for two minutes. To the emulsion were added 193.4 g of water and 40.3 g of tetraorthosilicate (Evonik, Parsippany, NJ). The resultant slurry was cured at room temperature (around 25° C.) for 48 hours to obtain Microcapsule Slurry C containing silica microcapsule C.

Examples 1-31

Composition 1

Composition 1 was prepared by reacting Microcapsule Slurry B and acrylic acid. More specifically, 1 g of Capsule Slurry B was mixed with 1 g of acrylic acid (Sigma Aldrich, St Louis, MO) at room temperature (around 25° C.) for 36 hours. The reaction mixture was then centrifuged and the aqueous layer removed by a pipette. The resultant capsule slurry was washed again with water (1 to 2 mL), centrifuged, and separated from the aqueous layer using a pipette. The washing step was repeated for 5 times to obtain Composition 1 containing Modified Microcapsule 1 having a polyurea microcapsule wall modified by acrylic acid.

In Modified Microcapsule 1, a carboxylic acid moiety is chemically bonded to the surface of the microcapsule wall via an amine bond formed by the Michael addition reaction between the primary or secondary amine groups on the surface of Microcapsule A and the α,β-unsaturated carboxylic acid (acrylic acid).

Composition 2

Composition 2 was prepared following the same procedure as Composition 1 except that the reaction was carried out at 50° C. for 24 hours.

Composition 3

Composition 3 was prepared following the same procedure as Composition 1 except that glycidyl trimethylammonium chloride (Sigma Aldrich, St. Louis, MO) was used instead of acrylic acid. Composition 3 thus prepared contains Modified Microcapsule 3 having a polyurea microcapsule wall modified by glycidyl trimethylammonium chloride.

The microcapsule wall has a trimethylammonium chloride moiety via a covalent bond (namely, hydroxyl amine group) formed by the reaction between the primary or secondary amine group on the surface of the microcapsule wall and the glycidyl group in glycidyl trimethylammonium chloride.

Composition 4

Composition 4 was prepared following the same procedure as Composition 3 except that the reaction was carried out at 50° C. for 24 hours.

Composition 5

Composition 5 was prepared by reacting the branched polyethyleneimine with glycidyl trimethylammonium chloride. More specifically, 1.7 g of a 30% branched polyethyleneimine aqueous solution (commercially available under the trademark of Lupasol® WF, BASF, Florham Park, NJ) was mixed with 1 g of 25% sodium hydroxide (Signa-Aldrich, St. Louis, MO) and 17.3 g of water. To the resultant solution was added 1 g of glycidyl trimethylammonium chloride and stirred at 55° C. for 16 hours to obtain Composition 5 containing Modified Polyethyleneimine 5.

The modified polyethyleneimine has a trimethylammonium chloride moiety covalently bonded to the branched polyethyleneimine via a hydroxyl amine group, which was formed by the ring-opening reaction between the primary or secondary amine group on the branched polyethyleneimine and the glycidyl group.

Composition 6

Composition 6 was prepared following the same procedure as Composition 5 except that 3-Chloro-2-hydroxypropyl)trimethylammonium chloride was used instead of glycidyl trimethylammonium chloride. Composition 6 thus prepared has a trimethylammonium chloride moiety covalently bonded to the branched polyethyleneimine via a hydroxyl amine group, which was formed by the substitute the chloro group in 3-Chloro-2-hydroxypropyl)trimethylammonium chloride with the primary or secondary amine group on the branched polyethyleneimine.

Composition 7

Composition 7 was prepared by reacting 20 g of Microcapsule Slurry A and 0.25 g of glycidyl trimethylammonium chloride (Sigma Aldrich) at a pH of 11 and room temperature for 24 hours. Composition 7 thus prepared contains Modified Microcapsule 3 and Modified Polyethyleneimine 5.

Composition 8

Composition 8 was prepared by reacting 20 g of Microcapsule Slurry A and 0.27 g of glycidyl trimethylammonium chloride (Sigma Aldrich), and 1 g of the branched polyethyleneimine (commercially available under the trademark of Lupasol® WF, BASF) at room temperature for 24 hours.

Composition 8 thus prepared contains Modified Microcapsule 3 and Modified Polyethyleneimine 5.

Composition 9

Composition 9 was prepared by reacting 20 g of Microcapsule Slurry A and 0.5 g of N,N-dimethyl acrylamide (Sigma Aldrich) and 750 ppm 4-methoxyphenol (Sigma Aldrich, as a catalyst) at 50° C. for 24 hours.

Composition 9 thus prepared contains Modified Microcapsule 9 having a polyurea microcapsule wall modified with N,N-dimethyl acrylamide.

In Modified Microcapsule 9, an N,N-dimethyl amide moiety is chemically bonded to the surface of the microcapsule wall via an amine bond formed by the Michael addition reaction between the primary or secondary amine groups on the surface of Microcapsule A and the α,β-unsaturated amide (N,N-dimethyl acrylamide).

Composition 9 was prepared using Microcapsule Slurry A that contains the free branched polyethyleneimine. During the preparation, the free branched polyethyleneimine was also reacted with N,N-dimethyl acrylamide. Thus, Composition 9 also contains Modified Polyethyleneimine 9 having a N,N-dimethyl amide moiety covalently bonded to the branched polyethyleneimine via an amine group, which was formed by the Michael addition reaction between the primary or secondary amine groups in the branched polyethyleneimine and the α,β-unsaturated amide (N,N-dimethyl acrylamide).

Composition 10

Composition 10 was prepared by reacting 20 g of Microcapsule Slurry A and 0.5 g of N-(isobutoxymethyl)acrylamide (Sigma Aldrich) and 750 ppm 4-methoxyphenol (Sigma Aldrich, as a catalyst) at room temperature (about 25° C.) for 24 hours.

Composition 10 thus prepared contains Modified Microcapsule 10 having a polyurea microcapsule wall modified with N-(isobutoxymethyl)acrylamide.

In Modified Microcapsule 10, an N-isobutoxymethyl amide moiety is chemically bonded to the surface of the microcapsule wall via an amine bond formed by the Michael addition reaction between the primary or secondary amine groups on the surface of Microcapsule A and the α,β-unsaturated amide (N-(isobutoxymethyl)acrylamide).

In addition, Composition 10 also contains Modified Polyethyleneimine 10 having a N-isobutoxymethyl amide moiety covalently bonded to the branched polyethyleneimine via an amine group, which was formed by the Michael addition reaction between the primary or secondary amine groups in the branched polyethyleneimine and the α,β-unsaturated amide (N-(isobutoxymethyl)acrylamide).

Composition 11

Composition 11 was prepared by reacting 20 g of Microcapsule Slurry A and 0.5 g of methacrylamidoethyl ethylene urea (MAEEU, commercially available under the trademark of Sipomer™ WAM II, from Solvay, Cranbury, NJ) and 750 ppm 4-methoxyphenol (Sigma. Aldrich, as a catalyst) at room temperature (about 25° C.) for 24 hours.

Composition 11 thus prepared contains Modified Microcapsule 11 having a polyurea microcapsule wall, to which a methacrylamidoethyl ethylene urea moiety is covalently bonded.

In Modified Microcapsule 11, an ethylene urea is chemically bonded to the surface of the microcapsule wall via an amine bond formed by the Michael addition reaction between the primary or secondary amine groups on the surface of Microcapsule A and the α,β-unsaturated amide (N-(isobutoxymethyl)acrylamide).

In addition, Composition 11 also contains Modified Polyethyleneimine 11 having an ethylene urea moiety covalently bonded to the branched polyethyleneimine via an amine group, which was formed by the Michael addition reaction between the primary or secondary amine groups in the branched polyethyleneimine and the methacrylamidoethyl ethylene urea.

Composition 12

Composition 12 was prepared by reacting 20 g of Microcapsule Slurry A and 0.05 g trimethylolpropane triglycidyl ether (Sigma-Aldrich, St. Louis, MO) at pH 11 and room temperature (about 25° C.) for 24 hours.

Composition 12 thus prepared contains Modified Microcapsule 12 having a polyurea microcapsule wall, to which a trimethylolpropane moiety is covalently bonded.

In Modified Microcapsule 12, a trimethylolpropane is chemically bonded to the surface of the microcapsule wall via a hydroxyl amine bond formed by the ring-opening reaction between the primary or secondary amine groups on the surface of Microcapsule A and the glycidyl groups.

In addition, Composition 12 also contains Modified Polyethyleneimine 12 having a a trimethylolpropane moiety covalently bonded to the branched polyethyleneimine via a hydroxyl amine group, which was formed by the ring-opening reaction between the primary or secondary amine groups in the branched polyethyleneimine and the trimethylolpropane triglycidyl ether.

Composition 13

Composition 13 was prepared by reacting 20 g of Microcapsule Slurry A and 0.05 g trimethylolpropane triglycidyl ether (Sigma-Aldrich, St. Louis, MO) dissolved in of Neobee oil (Stepan, Northfield, IL) at pH 11 and room temperature (about 25° C.) for 24 hours.

Composition 13 thus prepared contains Modified Microcapsule 12 and Modified Polyethyleneimine 12.

Composition 14

Composition 14 was prepared by reacting 20 g of Microcapsule Slurry B and 0.05 g trimethylolpropane triglycidyl ether (Sigma-Aldrich, St. Louis, MO) at pH 11 and room temperature (about 25° C.) for 24 hours.

Composition 14 thus prepared contains Modified Microcapsule 12.

Composition 15

Composition 15 was prepared by reacting 20 g of Microcapsule Slurry B, 0.05 g trimethylolpropane triglycidyl ether (Sigma-Aldrich, St. Louis, MO), and the branched polyethyleneimine (commercially available under the trademark of Lupasol® WF, BASF) at a level of 1.2% by weight of Composition 15. The mixture was stirred at pH 11 and room temperature (about 25° C.) for 24 hours.

Composition 15 thus prepared contains Modified Microcapsule 12 and Modified Polyethyleneimine 12.

Composition 16

Composition 16 was prepared by reacting 20 g of Microcapsule Slurry A, 1 g of 3-(methacryloylamino)propyl]trimethylammonium chloride (Sigma-Aldrich, St. Louis, MO) and 750 ppm 4-methoxyphenol (Sigma Aldrich) at room temperature (about 25° C.) for 24 hours.

Composition 16 thus prepared contains Modified Microcapsule 16 having a polyurea microcapsule wall, to which a trimethylammonium chloride moiety is covalently bonded.

In Modified Microcapsule 16, a trimethylammonium chloride moiety is chemically bonded to the surface of the microcapsule wall via an amine bond formed by the Michael addition reaction between the primary or secondary amine groups on the surface of Microcapsule A and 3-(methacryloylamino)propyl]trimethylammonium chloride.

In addition, Composition 16 also contains Modified Polyethyleneimine 16 having a trimethylammonium chloride moiety covalently bonded to the branched polyethyleneimine via an amine group, which was formed by the Michael addition reaction between the primary or secondary amine groups in the branched polyethyleneimine and the 3-(methacryloylamino)-propyl]trimethylammonium chloride.

Composition 17

Composition 17 was prepared by reacting 20 g of Microcapsule Slurry A, 1 g of (3-acrylamidopropyl)trimethylammonium chloride (Sigma-Aldrich) and 750 ppm 4-methoxyphenol (Sigma Aldrich) at room temperature (about 25° C.) for 24 hours.

Composition 17 thus prepared contains Modified Microcapsule 17 having a polyurea microcapsule wall, to which a trimethylammonium chloride moiety is covalently bonded.

In Modified Microcapsule 17, a trimethylammonium chloride moiety is chemically bonded to the surface of the microcapsule wall via an amine bond formed by the Michael addition reaction between the primary or secondary amine groups on the surface of Microcapsule A and (3-acrylamidopropyl)trimethylammonium chloride.

In addition, Composition 17 also contains Modified Polyethyleneimine 17 having a trimethylammonium chloride moiety covalently bonded to the branched polyethyleneimine via an amine group, which was formed by the Michael addition reaction between the primary or secondary amine groups in the branched polyethyleneimine and the (3-acrylamidopropyl)-trimethylammonium chloride.

Composition 18

Composition 18 was prepared by reacting 20 g of Microcapsule Slurry A, 1 g of N-[tris(hydroxymethyl)methyl]acrylamide (Sigma-Aldrich) and 750 ppm 4-methoxyphenol (Sigma-Aldrich) at room temperature (about 25° C.) for 24 hours.

Composition 18 thus prepared contains Modified Microcapsule 18 having a polyurea microcapsule wall, to which a tris(hydroxymethyl)methyl moiety is covalently bonded.

In Modified Microcapsule 18, a tris(hydroxymethyl)methyl moiety is chemically bonded to the surface of the microcapsule wall via an amine bond formed by the Michael addition reaction between the primary or secondary amine groups on the surface of Microcapsule A and N-[tris(hydroxymethyl)methyl]acrylamide.

In addition, Composition 18 also contains Modified Polyethyleneimine 18 having a tris(hydroxymethyl)methyl moiety covalently bonded to the branched polyethyleneimine via an amine group, which was formed by the Michael addition reaction between the primary or secondary amine groups in the branched polyethyleneimine and the N-[tris(hydroxymethyl)-methyl]acrylamide.

Composition 19

Composition 19 was prepared by reacting 20 g of Microcapsule Slurry A, 1 g of acrylamide (Sigma-Aldrich) and 750 ppm 4-methoxyphenol (Sigma-Aldrich) at room temperature (about 25° C.) for 24 hours.

Composition 19 thus prepared contains Modified Microcapsule 19 having a polyurea microcapsule wall, to which an amide moiety is covalently bonded.

In Modified Microcapsule 19, an amide moiety is chemically bonded to the surface of the microcapsule wall via an amine bond formed by the Michael addition reaction between the primary or secondary amine groups on the surface of Microcapsule A and acrylamide.

In addition, Composition 19 also contains Modified Polyethyleneimine 19 having an amide moiety covalently bonded to the branched polyethyleneimine via an amine group, which was formed by the Michael addition reaction between the primary or secondary amine groups in the branched polyethyleneimine and the acrylamide.

Composition 20

Composition 20 was prepared by reacting 20 g of Microcapsule Slurry A, 1 g of N-(3,4-dihydroxyphenethyl)acrylamide (commercially available from Alfa Chemistry) and 750 ppm 4-methoxyphenol (Sigma-Aldrich) at room temperature (about 25° C.) for 24 hours.

Composition 20 thus prepared contains Modified Microcapsule 20 having a polyurea microcapsule wall, to which a dihydroxyphenyl moiety is covalently bonded.

In Modified Microcapsule 20, a dihydroxyphenethyl moiety is chemically bonded to the surface of the microcapsule wall via an amine bond formed by the Michael addition reaction between the primary or secondary amine groups on the surface of Microcapsule A and N-(3,4-dihydroxyphenethyl)acrylamide.

In addition, Composition 20 also contains Modified Polyethyleneimine 20 having a dihydroxyphenyl moiety covalently bonded to the branched polyethyleneimine via an amine group, which was formed by the Michael addition reaction between the primary or secondary amine groups in the branched polyethyleneimine and the N-(3,4-dihydroxyphenethyl)acrylamide.

Composition 21

Composition 21 was prepared by reacting 20 g of Microcapsule Slurry A, 1 g of styrene oxide (Sigma-Aldrich) at room temperature (about 25° C.) for 24 hours.

Composition 21 thus prepared contains Modified Microcapsule 21 having a polyurea microcapsule wall, to which a phenyl moiety is covalently bonded.

In Modified Microcapsule 21, a phenyl moiety is chemically bonded to the surface of the microcapsule wall via a hydroxyl amine bond formed by the ring-opening reaction between the primary or secondary amine groups on the surface of Microcapsule A and the styrene oxide.

In addition, Composition 21 also contains Modified Polyethyleneimine 21 having a phenyl moiety covalently bonded to the branched polyethyleneimine via a hydroxyl amine group, which was formed by the Michael addition reaction between the primary or secondary amine groups in the branched polyethyleneimine and the styrene oxide.

Composition 22

Composition 22 was prepared by reacting 20 g of Microcapsule Slurry A, 0.025 g of 4-(prop-2-enamidomethyl) benzoic acid (Sigma-Aldrich) and 750 ppm 4-methoxyphenol (Sigma-Aldrich) at room temperature (about 25° C.) for 24 hours.

Composition 22 thus prepared contains Modified Microcapsule 22 having a polyurea microcapsule wall, to which a benzoic acid moiety is covalently bonded. In this microcapsule, a benzoic acid moiety is chemically bonded to the surface of the microcapsule wall via an amine bond formed by the Michael addition reaction between the primary or secondary amine groups on the surface of Microcapsule A and 4-(prop-2-enamidomethyl)benzoic acid.

In addition, Composition 22 also contains Modified Polyethyleneimine 22 having a benzoic acid moiety covalently bonded to the branched polyethyleneimine via an amine group, which was formed by the Michael addition reaction between the primary or secondary amine groups in the branched polyethyleneimine and 4-(prop-2-enamidomethyl) benzoic acid.

Composition 23

Composition 23 was prepared by reacting 20 g of Microcapsule Slurry A, 1 g of 2-ethylhexyl glycidyl ether (Sigma-Aldrich) at room temperature (about 25° C.) for 24 hours.

Composition 23 thus prepared contains Modified Microcapsule 23 having a polyurea microcapsule wall, to which a 2-ethylhexyl moiety is covalently bonded.

In Modified Microcapsule 23, a 2-ethylhexyl moiety is chemically bonded to the surface of the microcapsule wall via a hydroxyl amine bond formed by the ring-opening reaction between the primary or secondary amine groups on the surface of Microcapsule A and 2-ethylhexyl glycidyl ether.

In addition, Composition 23 also contains Modified Polyethyleneimine 23 having a 2-ethylhexyl moiety covalently bonded to the branched polyethyleneimine via a hydroxyl amine group, which was formed by the ring-opening reaction between the primary or secondary amine groups in the branched polyethyleneimine and 2-ethylhexyl glycidyl ether.

Composition 24

Composition 24 was prepared by reacting 20 g of Microcapsule Slurry A and 0.1 g of (3-glycidyloxypropyl) trimethoxysilane (Sigma-Aldrich) at room temperature for 24 hours.

Composition 24 thus prepared contains Modified Microcapsule 24 having a polyurea microcapsule wall, to which a trimethoxysilyl moiety is covalently bonded.

In Modified Microcapsule 24, a trimethoxysilyl moiety is chemically bonded to the surface of the microcapsule wall via a hydroxyl amine bond formed by the ring-opening reaction between the primary or secondary amine groups on the surface of Microcapsule A and (3-glycidyloxypropyl) trimethoxysilane.

In addition, Composition 24 also contains Modified Polyethyleneimine 24 having a trimethoxysilyl moiety covalently bonded to the branched polyethyleneimine via a hydroxyl amine group, which was formed by the ring-opening reaction between the primary or secondary amine groups in the branched polyethyleneimine and (3-glycidyloxypropyl) trimethoxysilane.

Composition 25

Composition 25 was prepared by reacting 20 g of Microcapsule Slurry A, 0.5 g of acrylamide (Sigma-Aldrich), 0.5 g glycidyl trimethylammonium chloride (Sigma Aldrich), and 750 ppm 4-methoxyphenol (Sigma-Aldrich) at room temperature (about 25° C.) for 24 hours.

Composition 25 thus prepared contains Modified Microcapsule 25 having a polyurea microcapsule wall, to which are covalently bonded two moieties: (i) an amide moiety and (ii) a trimethylammonium chloride moiety.

In Modified Microcapsule 25, two moieties are chemically bonded to the surface of the microcapsule wall: (i) an amide moiety and (ii) a trimethylammonium chloride moiety. The amide moiety is bonded via an amine bond formed by the Michael addition reaction between the primary or secondary amine groups on the surface of Microcapsule A and acrylamide. The trimethylammonium chloride moiety is bonded via a hydroxy amine bond formed by the ring-opening reaction between the primary or secondary amine groups on the surface of Microcapsule A and glycidyl trimethylammonium chloride.

In addition, Composition 25 also contains Modified Polyethyleneimine 25 having an amide moiety and a trimethylammonium chloride moiety, both covalently bonded to the branched polyethyleneimine via an amine or hydroxyl amine group.

Composition 26

Composition 26 was prepared by reacting 20 g of Microcapsule Slurry A, 0.5 g of acrylamide, 0.5 g of [3-(methacryloylamino)propyl]trimethylammonium chloride (Sigma Aldrich), and 750 ppm 4-methoxyphenol at room temperature for 24 hours.

Composition 26 thus prepared contains Modified Microcapsule 26 having a polyurea microcapsule wall, to which are covalently bonded two moieties: (i) an amide moiety and (ii) a trimethylammonium chloride moiety.

In Modified Microcapsule 26, two moieties are chemically bonded to the surface of the microcapsule wall: (i) an amide moiety and (ii) a trimethylammonium chloride moiety. The amide moiety is bonded via an amine bond formed by the Michael addition reaction between the primary or secondary amine groups on the surface of Microcapsule A and acrylamide. The trimethylammonium chloride moiety is bonded via an amine bond formed by the Michael addition reaction between the primary or secondary amine groups on the surface of Microcapsule A and [3-(methacryloylamino) propyl]trimethylammonium chloride.

In addition, Composition 26 also contains Modified Polyethyleneimine 26 having an amide moiety and a trimethylammonium chloride moiety, both covalently bonded to the branched polyethyleneimine via a separate amine group.

Composition 27

Composition 27 was prepared by reacting 20 g of Microcapsule Slurry A, 0.5 g of acrylamide, 0.5 g of (3-acrylamidopropyl)trimethylammonium chloride, and 750 ppm 4-methoxyphenol at room temperature for 24 hours.

Composition 27 thus prepared contains Modified Microcapsule 27 having a polyurea microcapsule wall, to which are covalently bonded two moieties: (i) an amide moiety and (ii) a trimethylammonium chloride moiety.

In Modified Microcapsule 27, two moieties are chemically bonded to the surface of the microcapsule wall: (i) an amide moiety and (ii) a trimethylammonium chloride moiety. The amide moiety is bonded via an amine bond formed by the Michael addition reaction between the primary or secondary amine groups on the surface of Microcapsule A and acrylamide. The trimethylammonium chloride moiety is bonded via an amine bond formed by the Michael addition reaction between the primary or secondary amine groups on the surface of Microcapsule A and (3-acrylamidopropyl) trimethylammonium chloride.

In addition, Composition 27 also contains Modified Polyethyleneimine 27 having an amide moiety and a trimethylammonium chloride moiety, both covalently bonded to the branched polyethyleneimine via a separate amine group.

Composition 28

Composition 28 was prepared by reacting 20 g of Microcapsule Slurry A, 0.5 g of N-[tris(hydroxymethyl)methyl] acrylamide (Sigma Aldrich), 0.5 g of glycidyl trimethylammonium chloride (Sigma Aldrich), and 750 ppm 4-methoxyphenol at room temperature for 24 hours.

Composition 28 thus prepared contains Modified Microcapsule 28 having a polyurea microcapsule wall, to which are covalently bonded two moieties: (i) a tris(hydroxymethyl)methyl moiety and (ii) a trimethylammonium chloride moiety.

In Modified Microcapsule 28, two moieties are chemically bonded to the surface of the microcapsule wall: (i) a tris(hydroxymethyl)methyl moiety and (ii) a trimethylammonium chloride moiety. The tris(hydroxymethyl)methyl moiety is bonded via an amine bond formed by the Michael addition reaction between the primary or secondary amine groups on the surface of Microcapsule A and N-[tris(hydroxymethyl)methyl]acrylamide. The trimethylammonium chloride moiety is bonded via a hydroxyl amine bond formed by the ring-opening reaction between the primary or secondary amine groups on the surface of Microcapsule A and glycidyl trimethylammonium chloride.

In addition, Composition 28 also contains Modified Polyethyleneimine 28 having an tris(hydroxymethyl)methyl moiety and a trimethylammonium chloride moiety, both covalently bonded to the branched polyethyleneimine via an amine or hydroxyl amine group.

Composition 29

Composition 29 was prepared by reacting 20 g of Microcapsule Slurry A, 0.5 g of acrylic acid (Sigma Aldrich), 0.5 g of glycidyl trimethylammonium chloride (Sigma Aldrich) and 750 ppm 4-methoxyphenol at room temperature for 24 hours.

Composition 29 thus prepared contains Modified Microcapsule 29 having a polyurea microcapsule wall, to which are covalently bonded two moieties: (i) a carboxylic acid moiety and (ii) a trimethylammonium chloride moiety.

In Modified Microcapsule 29, two moieties are chemically bonded to the surface of the microcapsule wall: (i) a carboxylic acid moiety and (ii) a trimethylammonium chloride moiety. The carboxylic acid moiety is bonded via an amine bond formed by the Michael addition reaction between the primary or secondary amine groups on the surface of Microcapsule A and acrylic acid. The trimethylammonium chloride moiety is bonded via a hydroxyl amine bond formed by the ring-opening reaction between the primary or secondary amine groups on the surface of Microcapsule A and glycidyl trimethylammonium chloride.

In addition, Composition 29 also contains Modified Polyethyleneimine 29 having a carboxylic acid moiety and a trimethylammonium chloride moiety, both covalently bonded to the branched polyethyleneimine via an amine or hydroxyl amine group.

Composition 30

Composition 30 was prepared by reacting 18 g of Microcapsule Slurry A, 8 g of Microcapsule Slurry C, and 0.25 g of (3-glycidyloxypropyl) trimethoxysilane (Sigma-Aldrich) at pH 11 and room temperature for 24 hours.

Composition 30 thus prepared contains Modified Microcapsule 30 having a polyurea microcapsule wall, to which a trimethoxysilane moiety is covalently bonded.

In Modified Microcapsule 30, a trimethoxysilyl moiety is chemically bonded to the surface of the microcapsule wall via a hydroxyl amine bond formed by the ring-opening reaction between the primary or secondary amine groups on the surface of Microcapsule A and (3-glycidyloxypropyl) trimethoxysilane.

In addition, Composition 30 also contains Modified Silica Microcapsule 30 having a silica microcapsule wall, to which a trimethoxysilyl moiety is covalently bonded.

Composition 31

Composition 31 was prepared by reacting 50 g of Microcapsule Slurry A, 1.9 g of decanal (International Flavors & Fragrances) at 55° C. for 5 hours.

Composition 31 thus prepared contains Modified Microcapsule 31 having a polyurea microcapsule wall, to which an imine moiety is covalently bonded.

In Modified Microcapsule 31, an imine moiety is chemically bonded to the surface of the microcapsule wall via an imine bond formed by the reaction between the primary amine groups on the surface of Microcapsule A and the aldehyde (decanal).

Zeta Potential

The zeta-potential of a microcapsule composition was measured using Malvern Zetasizer (Commercially available from Malvern, Inc.). A microcapsule composition (0.2 g) was diluted with 99.8 g of water to make a 0.2% test solution for the measurement. The experimental protocol provided by Zetasizer was followed. Microcapsule Slurries A and B and Microcapsule Compositions 1-4 were evaluated.

Microcapsule Slurry A has a zeta potential of +58.61 mV.
Microcapsule Slurry B has a zeta potential of +74.65 mV.
Microcapsule Composition 1 has a zeta potential of +22.66 mV.
Microcapsule Composition 2 has a zeta potential of −25.16 mV.
Microcapsule Composition 3 has a zeta potential of +45.12 mV.
Microcapsule Composition 4 has a zeta potential of +42.44 mV.

IR Spectroscopy

The IR spectra of the microcapsule compositions were measured using the Nicolet 6700 FT-IR spectrometer (commercially available from Thermo Scientific). The measurements were taken with the dried capsule samples. Based on the IR spectrum of Microcapsule Compositions 1 and 2, the distinct peak generally observed from the C=C stretch (acrylic acid, 1637 $cm^{-1}$) was not observed indicating surface modification through the chemical reaction of acrylic acid. Furthermore, absorption of =C—H bend at 933 cm$^{-1}$ was also not observed, indicating the consumption of the acrylic acid in the reaction. An increase in the absorption of O—H stretch (3320-3340 cm$^{-1}$), C—N stretch (1180-1240 cm$^{-1}$) and slight shift of C=O (1730 cm$^{-1}$ from 1700 cm$^{-1}$) compared to Microcapsule Slurry B confirmed the surface modification. For Microcapsule Compositions 3 and 4, there were increases in the absorption of O—H stretch (3325 cm$^{-1}$) and C—N stretch (1180-1240 cm$^{-1}$), indicating the formation of the hydroxyl group as a result of the ring-opening reaction of the glycidyl group. Peaks at 1266 cm$^{-1}$ and 869 cm$^{-1}$, indicative of the epoxide in glycidyl trimethylammonium chloride were not observed. Furthermore, the asymmetric epoxy ring deformation peak around 815-950 cm$^{-1}$ was not observed.

HPLC

High-Performance Liquid Chromatography (HPLC) analysis showed a residual acrylic acid content of 13.49 mmol (0.39 mmol, 28.1 mg reacted) and 13.06 mmol (0.82 mmol, 59.1 mg reacted) in Microcapsule Compositions 1 and 2, respectively. The results indicate the consumption of the excessive acrylic acid at the capsule surface. The two-fold differences were also aligned with the zeta-potential changes of COMPOSITION 1 & 2 against POLYUREA MICROCAPSULE 3.

NMR Spectroscopy: free BPEI Functionalization

The degree of functionalization to branched polyethyleneimine (BPEI) in Microcapsule Compositions 5 and 6 were investigated using a $^{13}$C-NMR spectrometer by Bruker.

Microcapsule Composition 5 was prepared from the starting material glycidyl trimethylammonium chloride. This starting material showed on the NMR spectrum the following peaks: (i) 53.5 ppm for the trimethylammonium group N(CH$_3$)$_3$, (ii) 68 ppm for the carbon atom on the CH$_2$ group of —CH$_2$—N(CH$_3$)$_3$, and (iii) two peaks at 45 ppm and 45.7 ppm for the glycidyl group —CH$_2$—O—(CH—)—. After the completion of the reaction, (i) the peak at 53.5 ppm was disappeared and a new peak at 55 ppm was found, (ii) the peak at 68 ppm was disappeared and a new peak at 69.5 ppm was observed, and (iii) both peaks at 45 ppm and 45.7 ppm were missing indicating the ring-opening of the glycidyl group. The changes in the NMR indicated the covalent bonding of the trimethylammonium group to BPEI.

Microcapsule Composition 6 was prepared from the starting material (3-chloro-2-hydroxypropyl)trimethylammonium chloride. This starting material showed on the NMR spectrum the following peaks: (i) 53.5 ppm for the trimethylammonium group N(CH$_3$)$_3$, (ii) 68.1 ppm for the carbon atom on the CH$_2$ group of —CH$_2$—N(CH$_3$)$_3$, and (iii) the peak at 47.9 ppm for the 3-chloro-2-hydroxylpropyl group —C—Cl. After the completion of the reaction, (i) the peak at 53.5 ppm was disappeared and a new peak at 55 ppm was found, (ii) the peak at 68.1 ppm was disappeared and a new peak at 70.5 ppm was observed, and (iii) the peak at 47.9 was missing indicating the substitution of Cl. The changes in the NMR indicated the covalent bonding of the trimethylammonium group to BPEI.

Examples 32-45

Shampoo Compositions

Shampoo Compositions S10-13, S15, S17-21, and S24-S30 were prepared by mixing Microcapsule Compositions 10-13, 15, 17-21, and 24-30, respectively, and a unfragranced model shampoo (e.g., commercially available from Magic Botanicals, New York) at a shear rate of 4000-6000 rpm for 2 minutes. The shampoo compositions thus prepared each contained 0.5% fragrance oil (i.e., 0.5% neat oil equivalent or NOE). A Comparative Shampoo was prepared in the same fashion except that Microcapsule Slurry A was used instead of one of the microcapsule compositions of this invention.

Deposition Evaluation

Microcapsule compositions of this invention showed unexpectedly high deposition on hair as compared to the Comparative Shampoo.

To evaluate the deposition of Shampoo Composition S10, 2 g of the composition was added to 2 bundles of wet hair swatches (8 strands) together with an external standard. After being lathered, the hair swatches were rinsed in 350 mL of hot water and then then line-dried for 24 hours, followed by extraction using methanol and analysis using GC. Deposition (in wt %) was calculated using the external standard as 100 wt %.

Following the same procedure, the wt % deposition was established for the Comparative Shampoo, and Shampoo Compositions S11-13, S15, S17-21, and S24-S30.

The Comparative Shampoo had a deposition of 3%. Each of Shampoo Compositions S11-13, S15, S17-21, and S24-S30 had a deposition of at least 21%, 7 folds that of the Comparative Shampoo.

Examples 46-61

Hair Conditioner Compositions

Hair Conditioner Compositions HC7-10, HC12, HC13, HC15-17, and HC21-29 were prepared by mixing of Microcapsule Compositions 7-10, 12, 13, 15-17, and 21-29, respectively, and a model hair conditioner. The hair conditioner compositions thus prepared each contained 0.5% fragrance oil (i.e., 0.5% neat oil equivalent or NOE).

A Comparative Hair Conditioner was prepared in the same fashion except that Microcapsule Slurry A was used instead of the microcapsule composition of this invention.

Deposition Evaluation

Microcapsule compositions of this invention showed unexpectedly high deposition in the hair conditioner use as compared to the Comparative Hair Conditioner.

To evaluate the deposition of Hair Conditioner Composition HC7, 2 g of the composition was added to 2 bundles of wet hair swatches (8 strands) together with an external standard (3a,4,5,6,7,7a-hexahydro-1H-4,7-methanoinden-1-yl propanoate, commercially available under the trademark of Cyclaprop® from IFF, Union Beach, NJ). After being lathered, the hair swatches were rinsed in 350 mL of hot water and then then line-dried for 24 hours, followed by extraction using methanol and analysis using GC. Deposition (in wt %) was calculated using the external standard as 100 wt %.

Following the same procedure, the wt % deposition was established for the Comparative Hair Conditioner, and Hair Conditioner Compositions HC8-10, HC12, HC13, HC15-17, and HC21-29. The Comparative Hair Conditioner had a deposition of 4%. Each of Hair Conditioner Compositions HC8-10, HC12, HC13, HC15-17, and HC21-29 had a deposition of at least 40%, 10 folds that of the Comparative Hair Conditioner.

Fragrance Intensity Evaluation

A panel of judges evaluated the intensity of fragrance for hair treated with Comparative Hair Conditioner, Hair Conditioners HC7 and HC12. After the hair swatches were treated with a hair conditioner and lined-tried for 24 hours as described above, they were smelled by a panel of judges, who then rated on a scale ranging from 0 to 10. A numerical value of 5 indicated the hair swatches produced a strong intensity, while a value of 10 indicated the hair swatches generated a very strong smell. One hair swatch was evaluated without brushing to obtain the pre-brush fragrance intensity and the other was used to obtain the post-brush fragrance intensity after brushing it with a comb.

Comparative Hair Conditioner had a pre-brush fragrance intensity of 0.8 and a post-brush fragrance intensity of 2.9.

Hair Conditioner HC7 had a pre-brush fragrance intensity of 1 and a post-brush fragrance intensity of 5.6.

Hair Conditioner HC12 had a pre-brush fragrance intensity of 1.75 and a post-brush fragrance intensity of 525.

Crosslinking Between Microcapsules

Microscopic photographs of Composition 30 show that polyurea microcapsule A (having a particle size of 10 microns in diameter) is crosslinked and surrounded by multiple silica microcapsule C (having a size of 2 microns in diameter).

Aldehyde Release Enhancement

Microcapsule Slurry 1 and Composition 31 were separately dosed into a solution of fragrance free spray starch base for sensory and headspace evaluations. The complexes were dosed at 0.5% (wt/wt) into spray starch based and homogenized at 4000 RPM using an Silverson homogenizer to ensure a homogeneous mixture. The spray starch was placed into a pump spray bottle. An aliquot of 0.5 g of the spray starch solution was applied to the hand cloth immediately before the ironing evaluation.

The above samples were then evaluated using the following protocol. The towel containing spray starch was folded once and placed under a plastic box. A collection tube was positioned under the lid of the box and the headspace of the equilibrated air was sampled using a collection rate of 750 ml/min for 1 min to obtain a pre-iron concentration. The towel was then ironed for 15 seconds and immediately covered in the plastic box. The headspace concentration was measured using a collection rate of 750 ml/min for 1 min to obtain a post-iron concentration.

The results showed that Microcapsule A had a pre-iron concentration of 0 ng/L and a post-iron concentration of 2 ng/L. By contrast, Composition 31 of this invention had a pre-iron concentration of 152 ng/L and a post-iron concentration of 486 ng/L.

Other Embodiments

All of the features disclosed in this specification may be combined in any combination. Each feature disclosed in this specification may be replaced by an alternative feature serving the same, equivalent, or similar purpose. Thus, unless expressly stated otherwise, each feature disclosed is only an example of a generic series of equivalent or similar features.

Indeed, to achieve the purpose of depositing an active material, one skilled in the art can design and prepare a capsule composition by using different encapsulating polymers, coatings, polyfunctional nucleophiles and/or electrophiles, and/or capsule formation aids, varying the concentrations of these wall-forming materials and/or catalysts to achieve desirable organoleptic or release profiles in a consumable product. Further, the ratios among polyfunctional nucleophiles and/or electrophiles, capsule forming aids, adjuvants, core modifiers, active materials, and catalysts can also be determined by a skilled artisan through assays known in the art to prepare capsule compositions with desirable properties.

From the above description, a skilled artisan can easily ascertain the essential characteristics of the present invention, and without departing from the spirit and scope thereof, can make various changes and modifications of the invention to adapt it to various usages and conditions. Thus, other embodiments are also within the claims.

What is claimed is:

1. A method of preparing a microcapsule composition comprising the steps of:
    (a) providing a microcapsule slurry containing a plurality of microcapsules, in which each microcapsule has a microcapsule core and a microcapsule wall encapsulating the microcapsule core, and the microcapsule wall, having an inner surface and an outer surface, is formed of an encapsulating polymer having a primary or secondary amine group,
    (b) providing a deposition agent having a reactive group, and
    (c) forming a covalent bond between the primary or secondary amine group and the reactive group to graft the deposition agent to the encapsulating polymer on the outer surface of the microcapsule wall to obtain a surface-modified microcapsule,
    wherein the deposition agent contains a quaternary ammonium moiety, an oxoimidazolidinyl moiety, a catechol moiety, a carboxylic moiety, an alkyl moiety, or a combination thereof, and the microcapsule core contains a fragrance, and
    wherein the covalent bond is an amine bond (N—C), an imine bond (N=C), an ether bond (O—C), an amide bond (—C(O)N—), or an ester bond (—C(O)O—).

2. The method of claim 1, wherein the reactive group is an epoxy group, an acryloyl group, a methacryloyl group, or an aldehyde group.

3. The method of claim 1, wherein the deposition agent is glycidyl trimethylammonium salt, N-(2-(2-oxoimidazolidin-1-yl)ethyl) methacrylamide, N-(2-(2-oxoimidazolidin-1-yl)ethyl) acrylamide, N-(3,4-dihydroxyphenethyl) methacrylamide, 3,4-dihydroxybenzaldehyde, [3-(methacryloylamino) propyl] trimethylammonium chloride, (3-Acrylamidopropyl)trimethylammonium, or combination thereof.

4. The method of claim 1, wherein the encapsulating polymer is
    (a) a polyurea polymer obtained from the reaction of a polyisocyanate and a polyamine;
    (b) a melamine-formaldehyde polymer;
    (c) a polyacrylate polymer; or
    (d) a silica polymer.

5. The method of claim 4, wherein the polyamine is a branched polyethyleneimine, linear polyethyleneimine, polyvinylamine, amine-modified polyvinylamine, or amodimethicone.

6. The method of claim 1, wherein the microcapsule slurry contains a free branched polyethyleneimine, and the deposition agent is reacted with the branched polyethyleneimine to form a modified polyethyleneimine.

7. A microcapsule composition prepared by the method of claim 1.

* * * * *